US008280627B2

(12) United States Patent
Sumiya et al.

(10) Patent No.: US 8,280,627 B2

(45) Date of Patent: Oct. 2, 2012

(54) MAP INFORMATION PROCESSING APPARATUS, NAVIGATION SYSTEM, AND PROGRAM

(75) Inventors: Kazutoshi Sumiya, Himeji (JP); Ryoko Hiramoto, Himeji (JP)

(73) Assignee: Micware Co., Ltd., Kobe (JP)

( * ) Notice: Subject to any disclaimer, the term of this patent is extended or adjusted under 35 U.S.C. 154(b) by 747 days.

(21) Appl. No.: 12/225,846

(22) PCT Filed: Feb. 26, 2007

(86) PCT No.: PCT/JP2007/053494

§ 371 (c)(1), (2), (4) Date: Sep. 29, 2008

(87) PCT Pub. No.: WO2008/015803

PCT Pub. Date: Jul. 2, 2008

(65) Prior Publication Data

US 2009/0132160 A1 May 21, 2009

(30) Foreign Application Priority Data

Aug. 2, 2006 (JP) ................................ 2006-210641

(51) Int. Cl.
*G01C 21/00* (2006.01)

(52) U.S. Cl. ...... 701/425; 701/400; 715/784; 455/414.1

(58) Field of Classification Search .................. 701/200, 701/212, 425
See application file for complete search history.

(56) References Cited

U.S. PATENT DOCUMENTS 7,107,285 B2 * 9/2006 von Kaenel et al. .................. 1/1
7,548,814 B2 * 6/2009 Pantalone et al. ............. 701/212
7,568,166 B2 * 7/2009 Kato ............................. 701/212
2004/0102931 A1 * 5/2004 Ellis et al. ...................... 702/188
2007/0130153 A1 * 6/2007 Nachman et al. ............... 707/10
2010/0075643 A1 * 3/2010 Cooper et al. ............. 455/414.1

FOREIGN PATENT DOCUMENTS

JP 2003-337823 11/2003
JP 2005-221470 8/2005
JP 2006-127117 5/2006
JP 2006-139509 6/2006

OTHER PUBLICATIONS

Its-mo Guide, the Internet <URL:http://www.its-mo.com/>.

(Continued)

*Primary Examiner* — Ryan Zeender
*Assistant Examiner* — Hunter Wilder
(74) *Attorney, Agent, or Firm* — Fox Rothschild LLP

(57) ABSTRACT

Conventional map information processing apparatuses have the problem of not being able to automatically provide appropriate information according to map browse operations. The present invention provides a map information processing apparatus, comprising: a map information storage portion in which map information, which is information of a map, can be stored; an accepting portion that accepts a map browse operation, which is an operation to browse the map; an operation information sequence acquiring portion that acquires operation information, which is information of an operation corresponding to the map browse operation; a keyword acquiring portion that acquires at least one keyword from the map information using the operation information; a retrieving portion that retrieves information using the at least one keyword; and an information output portion that outputs the information retrieved by the retrieving portion. With this map information processing apparatus, it is possible to automatically provide appropriate information according to map browse operations.

12 Claims, 25 Drawing Sheets

| ID | purpose identifying information | user operation | symbol |
| --- | --- | --- | --- |
| 1 | single-point specification | $m^*c^+i^+$ | S |
| 2 | multiple-point specification | $m^+o^+$ | M |
| 3 | selection specification | $i^+c[c^*m^*]^*$ | L |
| 4 | surrounding-area specification | $c^+m^*o^+$ | C |
| 5 | wide-area specification | $o^+m^+$ | F |

OTHER PUBLICATIONS

Satoru Takagi and one other, “Information Retrieval with Graphical Map”, Journal of Information Processing Society of Japan, 2000, vol. 41, No. 4, pp. 357-362.

Kaoru Hiramatsu and one other, “An Augmented Web Space for Regional Information Services”, Transactions of Information Processing Society of Japan, database, 2000, vol. 41, No. SIG6(TOD7), pp. 81-90.

Kaoru Hiramatsu and two others, “Web Search Extension based on Spatio-temporal Structure”, The 1st meeting of JSAI Special Interest Group on Semantic Web and Ontology, 2002, No. SIG-SWO-A201-08, The Japanese Society for Artificial Intelligence.

Hiroki Uematsu and four others, “Balog: Proposal of Use of Location-based Information in Web Log Environment”, The 6th meeting of Special Interest Group on Semantic Web and Ontology, 2004, No. SIG-SWO-A401-07, The Japanese Society for Artificial Intelligence.

Takeshi Kurashima and two others, “Blog Map of Experiences: Extraction and Geographical Mapping of Visitor Experiences from Urban Blogs”, The Special Interest Group Notes of Information Processing Society of Japan, 2005, vol. 2005, No. 67, 2005-DBS-137, pp. 47-53.

Taro Tezuka and one other, “Trajectory-based Prosentation of Heterogeneous Spatio-temporal Content”, Web and Wireless Geographical Information System—W2GIS2005, Lecture Notes in Computer Science 3833, pp. 235-245, Springer-Verlag.

Taro Tezuka and one other, “Query-Free Browsing of Local Information based on Landmark Extraction from the Web” DBSJ Letters, 2005, vol. 4, No. 1, pp. 141-144.

Joe Weakliam and two others, “Implicit interaction profiling for recommending spatial content” ACM GIS 2005, pp. 285-294.

Qiang MA and two others, “Localness Degree of Web Pages and Its Applications from Page Content and Location Information”, The Special Interest Group Notes of Information Processing Society of Japan, 2002, vol. 2002, No. 67, 2002-DBS-128-69, pp. 515-522.

Ryoko Hiramoto et al., “Chizu Interface ni Okeru User Sosa kara no Web Kensaku Hoshiki”, <URL; http://www.ieice.org/iss/de/DEWS/DEWS2006/doc/4B-oi2.pdf>, The Institute of Electronics, Info. and Communication Engineers Data Kogaku Workshop/The Database Society of Japan Nenji Taikai, Mar. 2007.

Ryoko Hiramoto et al., “Chizu Interface ni Okeru User Sosa kara no Web Kensaku Hoshiki”, The Database Society of Japan Ronbunshi, Jun. 22, 2006, vol. 5, No. 1, pp. 85 to 88.

Ryoko Hiramoto et al., A Web Search Method using Presentation of Geographic Objects for Navigation Systems, IPSJ SIG Technical Reports, 2006-DBS-140(I), Jul. 12, 2006, p. 163-170, vol. 2006, No. 77, Japan.

Ryoko Hiramoto et al., A Web Search Method using Presentation of Geographic Objects for Navigation Systems, IEICE Technical Report, DE2006-22-49, Jul. 12, 2006, p. 133-138, vol. 106, No. 148, Japan.

Notice of Reasons for Rejection issued in Japan Patent Application No. 2009-124831, Jan. 5, 2012.

* cited by examiner

FIG.10

| scale ID | term information | |
|---|---|---|
| | term | positional information (longitude, latitude) |
| scale A | Kyoto-city | (AX1,AY1) |
| | Mt. Arashiyama | (AX2,AY2) |
| | ⋮ | ⋮ |
| scale B | Kita-ward | (BX1,BY1) |
| | Kamigyo-ward | (BX2,BY2) |
| | ⋮ | ⋮ |
| scale C | Kinkaku-ji Temple | (CX1,CY1) |
| | Tanaka-cho | (CX2,CY2) |
| | ⋮ | ⋮ |
| scale D | Hirano Shrine | (DX1,DY1) |
| | Kitano-Tenmangu Shrine | (DX2,DY2) |
| | ⋮ | ⋮ |
| scale E | Bakuro-cho | (EX1,EY1) |
| | Kitano-hall | (EX2,EY2) |
| | ⋮ | ⋮ |

FIG.11

| ID | purpose identifying information | user operation | symbol |
|---|---|---|---|
| 1 | single-point specification | $m^*c^+i^+$ | S |
| 2 | multiple-point specification | $m^+o^+$ | M |
| 3 | selection specification | $i^+c[c^*m^*]^*$ | L |
| 4 | surrounding-area specification | $c^+m^*o^+$ | C |
| 5 | wide-area specification | $o^+m^+$ | F |

FIG.12

| ID | purpose identifying information | combination of atomic operation chunks | trigger | user operation |
|---|---|---|---|---|
| 1 | refinement search | **S** *after* **S** *overlaps* **L** | c *included_in* **L** or m *included_in* **L** | $m^*c^+i^+ \cdots$<br>$m^*c^+i^+c[c^*m^*]^*$ |
| 2 | comparison search | **L** *meets* **M** *overlaps* **F** | o *included_in* **M** or m *included_in* **F** | $i^+c[c^*m^*]^*m^+o^+(m^+)$ |
| 3 | route search | **C** *meets* **L** | c *just_after* i *included_in* **M** | $c^+m^*o^+i^+c[c^*m^*]^*$ |

FIG.15

| operation information | | i | c | i | i |
|---|---|---|---|---|---|
| scale ID | scale A | scale B | scale B | scale C | scale D |
| center position | (XA1,YA1) | (XB1,YB1) | (XB2,YB2) | (XC1,YC1) | (XD1,YD1) |
| search | | | | | |
| keyword | | | | | |

FIG.16

| operation information | | i | c | i | i | c |
|---|---|---|---|---|---|---|
| scale ID | scale A | scale B | scale B | scale C | scale D | scale D |
| center position | (XA1,YA1) | (XB1,YB1) | (XB2,YB2) | (XC1,YC1) | (XD1,YD1) | (XD2,YD2) |
| search | | | | | | refinement search |
| keyword | | | | | | (1) Kitano-Tenmangu Shrine (2) Kamigyo-ward |

FIG.17

Kitano-Tenmangu Shrine

1. News

2. Information of Wedding Ceremonies

FIG.18

| operation information | | i | c | i | i | c |
|---|---|---|---|---|---|---|
| scale ID | scale A | scale B | scale B | scale C | scale D | scale D |
| center position | (XA1,YA1) | (XB1,YB1) | (XB2,YB2) | (XC1,YC1) | (XD1,YD1) | (XD2,YD2) |
| search | | | | | | refinement search |
| keyword | | | | | | (1) Kitano-Tenmangu Shrine<br>(2) Kamigyo-ward |

| operation information | m | o |
|---|---|---|
| scale ID | scale D | scale C |
| center position | (XD3,YD3) | (XC2,YC2) |
| search | | comparison search |
| keyword | | Kinkaku-ji Temple |

FIG.22

| operation information | | i | c | i | i | c |
|---|---|---|---|---|---|---|
| scale ID | scale A | scale B | scale B | scale C | scale D | scale D |
| center position | (XA1,YA1) | (XB1,YB1) | (XB2,YB2) | (XC1,YC1) | (XD1,YD1) | (XD2,YD2) |
| search | | | | | | refinement search |
| keyword | | | | | | (1) Kitano-Tenmangu Shrine (2) Kamigyo-ward |

| operation information | m | o | c | o | i | c |
|---|---|---|---|---|---|---|
| scale ID | scale D | scale C | scale C | scale B | scale C | scale C |
| center position | (XD3,YD3) | (XC2,YC2) | (XC3,YC3) | (XB3,YB3) | (XC4,YC4) | (XC5,YC5) |
| search | | comparison search | | | | route search |
| keyword | | Kinkaku-ji Temple | | | | Kitano Hakubai-cho |

MAP INFORMATION PROCESSING APPARATUS, NAVIGATION SYSTEM, AND PROGRAM

TECHNICAL FIELD

The present invention relates to map information processing apparatuses and the like for retrieving information according to a browse operation of a map.

BACKGROUND ART

Conventional map information processing apparatuses such as car navigation systems have realized a function to present information and the like relating to a map region that is being displayed on a screen. Examples thereof include a function to search for a gas station within a certain distance from the present location.

Furthermore, as a second conventional technique, a function is provided for an online map on the web and the like, in which information (information of restaurants, traffic facilities, etc.) relating to a currently displayed local area is presented as additional information (see Non-Patent Document 1, for example).

Furthermore, as a third conventional technique, there is a technique that enables a user to easily change the region and the scale of a map on a screen that the user is watching, with an operation on the online map (see Non-Patent Document 2, for example).

Furthermore, as a fourth conventional technique, there is a technique that enables web search to be performed in view of geography, by providing the content of a currently existing web page with a geographical structure, and associating it with the geographic coordinates in a real space (see Non-Patent Documents 3 and 4).

Furthermore, as a fifth conventional technique, there is a technique that visually expresses information distribution, using a method in which images transmitted by users to a server are attached to a map based on added positional information (see Non-Patent Document 5).

Furthermore, as a sixth conventional technique, there is a technique that enables blog search to be more effectively performed, by dividing keywords in blogs into 'targets' for the purpose of which many people travel and 'experiences' of people, based on the collocational relationship between the geographical or landmark name and the particle (see Non-Patent Document 6).

Furthermore, as a seventh conventional technique, there is a technique that enables a user to passively browse local information on the web along a route, by drawing the route on a map. A web page that is displayed on a system provided with this technique is determined according to the level of geographical significance calculated in advance. Furthermore, the level of detail of information that is to be presented is changed according to a zoom-in or zoom-out operation performed by the user on the map. If the user performs a zoom-out operation, a web page that contains keywords with high level of geographical significance is displayed. If the user performs a zoom-in operation, it is regarded that the user wants more detailed information of that local region, and a web page that contains keywords with low level of geographical significance is displayed (see Non-Patent Documents 7 and 8). In this technique, a purpose of the user is presumed based on only a single user operation on the map, and information is retrieved.

Furthermore, as an eighth conventional technique, there is a system that presents on-screen maps that are different for operations of individuals, based on a single map operation of a user (see Non-Patent Document 9).

Moreover, as a related technique, there is a technique of a so-called MBR (minimum bounding rectangle) described later (see Non-Patent Document 10).

[Non-Patent Document 1] Its-mo Guide, the Internet <URL: http://www.its-mo.com/>

[Non-Patent Document 2] Satoru Takagi and one other, "Information Retrieval with Graphical Map", Journal of Information Processing Society of Japan, 2000, Vol. 41, No. 4, pp. 357-362.

[Non-Patent Document 3] Kaoru Hiramatsu and one other, "An Augmented Web Space for Regional Information Services", Transactions of Information Processing Society of Japan, database, 2000, Vol. 41, No. SIG6(TOD7), pp. 81-90.

[Non-Patent Document 4] Kaoru Hiramatsu and two others, "Web Search Extension based on Spatio-temporal Structure", The 1st meeting of JSAI Special Interest Group on Semantic Web and Ontology, 2002, No. SIG-SW0-A201-08, The Japanese Society for Artificial Intelligence.

[Non-Patent Document 5] Hiroki Uematsu and four others, "Balog: Proposal of Use of Location-based Information in Web Log Environment", The 6th meeting of Special Interest Group on Semantic Web and Ontology, 2004, No. SIG-SWO-A401-07, The Japanese Society for Artificial Intelligence.

[Non-Patent Document 6] Takeshi Kurashima and two others, "Blog Map of Experiences: Extraction and Geographical Mapping of Visitor Experiences from Urban Blogs", The Special Interest Group Notes of Information Processing Society of Japan, 2005, Vol. 2005, No. 67, 2005-DBS-137, pp. 47-53.

[Non-Patent Document 7] Taro Tezuka and one other, "Trajectory-based Presentation of Heterogeneous Spatio-temporal Content", Web and Wireless Geographical Information Systems—W2GIS2005, Lecture Notes in Computer Science 3833, pp. 235-245, Springer-Verlag.

[Non-Patent Document 8] Taro Tezuka and one other, "Query-Free Browsing of Local Information based on Landmark Extraction from the Web" DBSJ Letters, 2005, Vol. 4, No. 1, pp. 141-144.

[Non-Patent Document 9] Joe Weakliam and two others, "Implicit interaction profiling for recommending spatial content" ACM GIS 2005, pp. 285-294.

[Non-Patent Document 10] Qiang Ma and two others, "Localness Degree of Web Pages and Its Applications from Page Content and Location Information", The Special Interest Group Notes of Information Processing Society of Japan, 2002, Vol. 2002, No. 67, 2002-DBS-128-69, pp. 515-522.

DISCLOSURE OF INVENTION

Problems to be Solved by the Invention

However, in conventional map information processing apparatuses such as car navigation systems or online maps, only related information (related web page, etc.) contained in a map region that is currently displayed is presented.

Furthermore, in the conventional techniques in Non-Patent Documents 2 to 9, it was impossible to obtain related information by presuming a purpose of the user who performs map operations based on a map browse operation sequence, which is multiple map browse operations. Thus, it was impossible to present appropriate information according to the map operations performed by the user.

It is an object of the present invention to provide appropriate information, by automatically detecting an operation sequence performed by a user on a map.

Means for Solving the Problems

A first aspect of the present invention is directed to a map information processing apparatus, comprising: a map information storage portion in which map information, which is information of a map, can be stored; an accepting portion that accepts a map browse operation sequence, which is multiple operations to browse the map; an operation information sequence acquiring portion that acquires an operation information sequence, which is information of multiple operations corresponding to the map browse operation sequence; a keyword acquiring portion that acquires at least one keyword from the map information using the operation information sequence; a retrieving portion that retrieves information using the at least one keyword; and an information output portion that outputs the information retrieved by the retrieving portion.

With this configuration, it is possible to provide appropriate information, by automatically detecting an operation sequence performed by a user on a map.

Furthermore, a second aspect of the present invention is directed to the map information processing apparatus according to the first aspect, wherein the accepting portion also accepts an instruction to output the map, and the map information processing apparatus further comprises: a map output portion that reads the map information and outputs the map in a case where the accepting portion accepts an instruction to output the map; and a map output changing portion that changes output of the map according to a map browse operation in a case where the accepting portion accepts the map browse operation.

With this configuration, it is also possible to change output of the map.

Furthermore, a third aspect of the present invention is directed to the map information processing apparatus according to the second aspect, wherein the keyword acquiring portion comprises: a search range management information storage unit in which at least two pieces of search range management information are stored, each of which is a pair of an operation information sequence and search range information, which is information of a map range of a keyword that is to be acquired; a search range information acquiring unit that acquires search range information corresponding to the operation information sequence that is at least one piece of operation information acquired by the operation information sequence acquiring portion, from the search range management information storage unit; and a keyword acquiring unit that acquires at least one keyword from the map information, according to the search range information acquired by the search range information acquiring unit.

With this configuration, it is possible to define a keyword search range that matches the operation information sequence pattern, and to provide information that appropriately matches a purpose of the user who performs map operations.

Furthermore, a fourth aspect of the present invention is directed to the map information processing apparatus according to the third aspect, wherein the map browse operation includes a zoom-in operation (symbol [i]), a zoom-out operation (symbol [o]), a move operation (symbol [m]), and a centering operation (symbol [c]), and the operation information sequence is any one of a single-point specifying operation information sequence, which is information indicating an operation sequence of m*c+i+([*] refers to repeating an operation at least zero times, and [+] refers to repeating an operation at least once), and is an operation information sequence specifying one arbitrary point; a multiple-point specifying operation information sequence, which is information indicating an operation sequence of m+o+, and is an operation information sequence specifying at least two arbitrary points; a selection specifying operation information sequence, which is information indicating an operation sequence of i+c[c*m*]*, and is an operation information sequence sequentially selecting multiple points; a surrounding-area specifying operation information sequence, which is information indicating an operation sequence of c+m*o+, and is an operation information sequence checking positional relationship between multiple points; a wide-area specifying operation information sequence, which is information indicating an operation sequence of o+m+, and is an operation information sequence causing movement along multiple points; and a combination of the five types of operation information sequences.

With this configuration, it is possible to provide information that appropriately matches a purpose of the user who performs map operations.

Furthermore, a fifth aspect of the present invention is directed to the map information processing apparatus according to the fourth aspect, wherein the combination of the five types of operation information sequences is any one of: a refinement search operation information sequence, which is an operation information sequence in which a single-point specifying operation information sequence is followed by a single-point specifying operation information sequence, and then the latter single-point specifying operation information sequence is followed by and partially overlapped with a selection specifying operation information sequence; a comparison search operation information sequence, which is an operation information sequence in which a selection specifying operation information sequence is followed by a multiple-point specifying operation information sequence, and then the multiple-point specifying operation information sequence is followed by and partially overlapped with a wide-area specifying operation information sequence; and a route search operation information sequence, which is an operation information sequence in which a surrounding-area specifying operation information sequence is followed by a selection specifying operation information sequence.

With this configuration, it is possible to provide information that more appropriately matches a purpose of the user who performs map operations.

Furthermore, a sixth aspect of the present invention is directed to the map information processing apparatus according to the fifth aspect, wherein in the search range management information storage unit, at least search range management information is stored that has a refinement search operation information sequence and refinement search target information as a pair, the refinement search target information being information to the effect that a keyword of a destination point is acquired that is a point near the center point of the map output in a centering operation accepted after a zoom-in operation or in a move operation accepted after a zoom-in operation, and in a case where it is judged that the operation information sequence that is at least two pieces of operation information acquired by the operation information sequence acquiring portion corresponds to the refinement search operation information sequence, the search range information acquiring unit acquires the refinement search target information, and the keyword acquiring unit acquires at least a keyword of a destination point corresponding to the refinement search target information acquired by the search range information acquiring unit.

With this configuration, it is possible to acquire information that matches a purpose of the user who performs a refinement search.

Furthermore, a seventh aspect of the present invention is directed to the map information processing apparatus according to the sixth aspect, wherein the refinement search target information also includes information to the effect that a keyword of a mark point is acquired that is a point near the center point of the map output in a centering operation accepted before the zoom-in operation, and the keyword acquiring unit also acquires a keyword of a mark point corresponding to the refinement search target information acquired by the search range information acquiring unit.

With this configuration, it is possible to acquire information that matches a purpose of the user who performs a refinement search.

Furthermore, an eighth aspect of the present invention is directed to the map information processing apparatus according to the fifth aspect, wherein in the search range management information storage unit, at least search range management information is stored that has a comparison search operation information sequence and comparison search target information as a pair, the comparison search target information being information indicating a region representing a difference between the region of the map output after a zoom-out operation and the region of the map output before the zoom-out operation, and in a case where it is judged that the operation information sequence that is at least two pieces of operation information acquired by the operation information sequence acquiring portion corresponds to the comparison search operation information sequence, the search range information acquiring unit acquires the comparison search target information, and the keyword acquiring unit acquires at least a keyword corresponding to the comparison search target information acquired by the search range information acquiring unit.

With this configuration, it is possible to acquire information that matches a purpose of the user who performs a comparison search.

Furthermore, a ninth aspect of the present invention is directed to the map information processing apparatus according to the fifth aspect, wherein in the search range management information storage unit, at least search range management information is stored that has a comparison search operation information sequence and comparison search target information as a pair, the comparison search target information being information indicating a region obtained by excluding the region of the map output before a move operation from the region of the map output after the move operation, and in a case where it is judged that the operation information sequence that is at least two pieces of operation information acquired by the operation information sequence acquiring portion corresponds to the comparison search operation information sequence, the search range information acquiring unit acquires the comparison search target information, and the keyword acquiring unit acquires at least a keyword corresponding to the comparison search target information acquired by the search range information acquiring unit.

With this configuration, it is possible to acquire information that matches a purpose of the user who performs a comparison search.

Furthermore, a tenth aspect of the present invention is directed to the map information processing apparatus according to the eighth aspect, wherein the information retrieved by the retrieving portion is multiple web pages on the Internet, and in a case where a keyword corresponding to the comparison search target information acquired by the search range information acquiring unit is acquired, and the number of keywords acquired is only one, the keyword acquiring unit searches the multiple web pages for a keyword having the highest level of collocation with the one keyword, and acquires the keyword.

With this configuration, it is possible to acquire information that matches a purpose of the user who performs a comparison search.

Furthermore, an eleventh aspect of the present invention is directed to the map information processing apparatus according to the fifth aspect, wherein in the search range management information storage unit, at least search range management information is stored that has a route search operation information sequence and route search target information as a pair, the route search target information being information to the effect that a keyword of a destination point is acquired that is a point near the center point of the map output in an accepted zoom-in operation or zoom-out operation, and in a case where it is judged that the operation information sequence that is at least one piece of operation information acquired by the operation information sequence acquiring portion corresponds to the route search operation information sequence, the search range information acquiring unit acquires the route search target information, and the keyword acquiring unit acquires at least a keyword of a destination point corresponding to the route search target information acquired by the search range information acquiring unit.

With this configuration, it is possible to acquire information that matches a purpose of the user who performs a route search.

Furthermore, a twelfth aspect of the present invention is directed to the map information processing apparatus according to the eleventh aspect, wherein the route search target information also includes information to the effect that a keyword of a mark point is acquired that is a point near the center point of the map output in a centering operation accepted before the zoom-in operation, and the keyword acquiring unit also acquires a keyword of a mark point corresponding to the route search target information acquired by the search range information acquiring unit.

With this configuration, it is possible to acquire information that matches a purpose of the user who performs a route search.

Furthermore, a thirteenth aspect of the present invention is directed to the map information processing apparatus according to the first aspect, wherein the operation information sequence acquiring portion acquires an operation information sequence, which is a series of at least two pieces of operation information, and ends one automatically acquired operation information sequence in a case where a given condition is matched, and the keyword acquiring portion acquires at least one keyword from the map information using the one operation information sequence.

With this configuration, it is possible to automatically acquire a break in map operations performed by the user, and to more appropriately retrieve information.

Furthermore, a fourteenth aspect of the present invention is directed to the map information processing apparatus according to the thirteenth aspect, wherein the given condition is a situation in which a movement distance in a move operation is larger than a predetermined threshold value.

With this configuration, it is possible to automatically acquire a break in map operations performed by the user, and to more appropriately retrieve information.

Furthermore, a fifteenth aspect of the present invention is directed to the map information processing apparatus according to the first aspect, wherein the information to be retrieved by the retrieving portion is at least one web page on the Internet.

With this configuration, it is possible to retrieve appropriate information from information storage apparatuses on the web.

Furthermore, a sixteenth aspect of the present invention is directed to the map information processing apparatus according to the twelfth aspect, wherein the information to be retrieved by the retrieving portion is at least one web page on the Internet, and in a case where the accepting portion accepts a refinement search operation information sequence, the retrieving portion retrieves a web page that has the keyword of the destination point in a title thereof and the keyword of the mark point in a page thereof.

With this configuration, it is possible to acquire appropriate web pages.

Furthermore, a seventeenth aspect of the present invention is directed to the map information processing apparatus according to the twelfth aspect, wherein the map information has map image information indicating an image of the map, and term information having a term on the map and positional information indicating the position of the term, the information to be retrieved by the retrieving portion is at least one web page on the Internet, and the retrieving portion acquires at least one web page that contains both the keyword of the mark point and the keyword of the destination point, detects at least two terms from each of the at least one web page that has been acquired, acquires at least two pieces of positional information indicating the positions of the at least two terms, from the map information, acquires geographical range information, which is information indicating a geographical range of a description of a web page, for each web page, using the at least two pieces of positional information, and acquires at least a web page in which the geographical range information indicates the smallest geographical range.

With this configuration, it is possible to acquire appropriate web pages.

Furthermore, an eighteenth aspect of the present invention is directed to the map information processing apparatus according to the seventeenth aspect, wherein in a case where at least one web page that contains both the keyword of the mark point and the keyword of the destination point is acquired, the retrieving portion acquires at least one web page that has at least one of the keywords in a title thereof.

With this configuration, it is possible to acquire more appropriate web pages.

Effect of the Invention

With a map information processing apparatus according to the present invention, it is possible to provide appropriate information, by automatically detecting an operation sequence performed by a user on a map.

BEST MODE FOR CARRYING OUT THE INVENTION

Hereinafter, embodiments of a map information processing apparatus and the like will be described with reference to the drawings. It should be noted that constituent elements denoted by the same reference numerals in the embodiments perform similar operations, and thus a description thereof may not be repeated.

EMBODIMENTS

FIG. 1 is a conceptual diagram of a map information processing system in this embodiment. The map information processing system has a map information processing apparatus 11 and one or more information storage apparatuses 12.

FIG. 2 is a block diagram of the map information processing system in this embodiment. The map information processing apparatus 11 includes a map information storage portion 1101, an accepting portion 1102, a map output portion 1103, a map output changing portion 1104, an operation information sequence acquiring portion 1105, a keyword acquiring portion 1106, a retrieving portion 1107, and an information output portion 1108.

The keyword acquiring portion 1106 includes a search range management information storage unit 11061, a search range information acquiring unit 11062, and a keyword acquiring unit 11063.

In the information storage apparatuses 12, information that can be retrieved by the map information processing apparatus 11 is stored. The information storage apparatuses 12 read information according to a request from the map information processing apparatus 11, and transmit the information to the map information processing apparatus 11. The information is, for example, web pages, records stored in databases, or the like. There is no limitation on the data type or format of the information. The information storage apparatuses 12 are web servers holding web pages, database servers provided with databases, or the like.

In the map information storage portion 1101, map information, which is information of a map, may be stored. The map information of the map information storage portion 1101 may be information acquired from another apparatus, or may be information stored in advance in the map information processing apparatus 11. The map information has, for example, map image information indicating an image of the map, and term information having a term and positional information indicating the position of the term on the map. The map image information is, for example, bitmap or vector data constituting the map. The term has a character string of, for example, a geographical name, a name of a building, scenic beauty, or location, or the like indicated on the map. Furthermore, the positional information is information having the longitude and the latitude on the map, XY coordinate values on a two-dimensional plane. Furthermore, the map information also may be an ISO kiwi map data format. Furthermore, the map information preferably has the map image information and the term information for each scale. The map information storage portion 1101 is preferably a non-volatile storage medium, but can be realized also as a volatile storage medium.

The accepting portion 1102 accepts various instructions and operations from the user. The various instructions and operations are, for example, an instruction to output the map, a map browse operation, which is an operation to browse the map, or the like. The map browse operation is a zoom-in operation (hereinafter, the zoom-in operation may be indicated as the symbol [i]), a zoom-out operation (hereinafter, the zoom-out operation may be indicated as the symbol [o]), a move operation (hereinafter, the move operation may be indicated as the symbol [m]), a centering operation (hereinafter, the centering operation may be indicated as the symbol [c]), and the like. Furthermore, multiple map browse operations are collectively referred to as a map browse operation sequence. There is no limitation on the input unit of the various instructions and operations, and a keyboard, a mouse, a menu screen, a touch panel, or the like may be used. The accepting portion 1102 can be realized as a device driver of an input unit such as a mouse, control software for a menu screen, or the like.

If the accepting portion 1102 accepts an instruction to output the map, the map output portion 1103 reads the map information from the map information storage portion 1101 and outputs the map. It will be appreciated that the map output portion 1103 may read and output only the map image information. Herein, the output has a concept that includes output to a display, printing in a printer, outputting a sound, transmission to an external apparatus, and the like. The map output portion 1103 may be considered to include, or to not include, an output device such as a display or a loudspeaker. The map output portion 1103 can be realized as, for example, driver software for an output device, or a combination of driver software for an output device and the output device.

If the accepting portion 1102 accepts a map browse operation, the map output changing portion 1104 changes output of the map according to the map browse operation. Here, 'to change output of the map' also refers to a state in which an instruction to change output of the map is given to the map output portion 1103.

More specifically, if the accepting portion 1102 accepts a zoom-in operation, the map output changing portion 1104 zooms in on the map that has been output. If the accepting portion 1102 accepts a zoom-out operation, the map output changing portion 1104 zooms out from the map that has been output. Furthermore, if the accepting portion 1102 accepts a move operation, the map output changing portion 1104 moves the map that has been output, according to the operation. Moreover, if the accepting portion 1102 accepts a centering operation, the map output changing portion 1104 moves the screen so that a point indicated by an instruction on the map that has been output is positioned at the center of the screen. The process performed by the map output changing portion 1104 is a known art, and thus a detailed description thereof has been omitted. The map output changing portion 1104 may perform a process of writing information designating the map after the change (e.g., the scale of the map, and the positional information of the center point of the map that has been output, etc.) to a buffer. Here, the information designating the map after the change is referred to as 'output map designating information' as appropriate.

The map output changing portion 1104 can be realized typically as an MPU, a memory, or the like. Typically, the processing procedure of the map output changing portion 1104 is realized by software, and the software is stored in a storage medium such as a ROM. Note that the processing procedure also may be realized by hardware (dedicated circuit).

The operation information sequence acquiring portion 1105 acquires an operation information sequence, which is information of operations corresponding to the map browse operation sequence. The operation information sequence acquiring portion 1105 acquires an operation information sequence, which is a series of two or more pieces of operation information, and ends one automatically acquired operation information sequence if a given condition is matched. The operation information sequence is, for example, as follows. First, as an example of the operation information sequence, there is a single-point specifying operation information sequence, which is information indicating the operation sequence 'm*c+i+', and is an operation information sequence specifying one arbitrary point. Here, [*] refers to repeating an operation zero or more times, [+] refers to repeating an operation one or more times. Furthermore, as an example of the operation information sequence, there is a multiple-point specifying operation information sequence, which is information indicating the operation sequence 'm+o+', and is an operation information sequence specifying two or more arbitrary points. Furthermore, as an example of the operation information sequence, there is a selection specifying operation information sequence, which is information indicating the operation sequence 'i+c[c*m*]*', and is an operation information sequence sequentially selecting multiple points. Furthermore, as an example of the operation information sequence, there is a surrounding-area specifying operation information sequence, which is information indicating the operation sequence 'c+m*o+', and is an operation information sequence checking the positional relationship between multiple points. Furthermore, as an example of the operation information sequence, there is a wide-area specifying operation information sequence, which is information indicating the operation sequence 'o+m+', and is an operation information sequence causing movement along multiple points. Moreover, there are operation sequences in which the above-described five types of operation information sequences (single-point specifying operation information sequence, multiple-point specifying operation information sequence, selection specifying operation information sequence, surrounding-area specifying operation information sequence, and wide-area specifying operation information sequence) are combined.

Examples of the combination of the above-described five types of operation information sequences include a refinement search operation information sequence, a comparison search operation information sequence, and a route search operation information sequence, which are described below. The refinement search operation information sequence is an operation information sequence in which a single-point specifying operation information sequence is followed by a single-point specifying operation information sequence, and then the latter single-point specifying operation information sequence is followed by and partially overlapped with a selection specifying operation information sequence. The comparison search operation information sequence is an operation information sequence in which a selection specifying operation information sequence is followed by a multiple-point specifying operation information sequence, and then the multiple-point specifying operation information sequence is followed by and partially overlapped with a wide-area specifying operation information sequence. The route search operation information sequence is an operation information sequence in which a surrounding-area specifying operation information sequence is followed by a selection specifying operation information sequence.

Furthermore, examples of the given condition indicating a break of one operation information sequence described above include a situation in which a movement distance in the move operation is larger than a predetermined threshold value. Examples of the given condition further include a situation in which the accepting portion 1102 has not accepted an operation for a certain period of time. Examples of the given condition further include a situation in which the accepting portion 1102 has accepted an instruction from the user to end the map operation (including an instruction to turn the power off).

The operation information sequence acquiring portion 1105 can be realized typically as an MPU, a memory, or the like. Typically, the processing procedure of the operation information sequence acquiring portion 1105 is realized by software, and the software is stored in a storage medium such as a ROM. Note that the processing procedure also may be realized by hardware (dedicated circuit).

The keyword acquiring portion 1106 acquires one or more keywords from the map information using the operation information sequence. The keyword acquiring portion 1106 acquires one or more keywords from the map information of the map information storage portion 1101, using the one operation information sequence acquired by the operation information sequence acquiring portion 1105. The keyword acquiring portion 1106 typically acquires a term from the term information contained in the map information. A term is synonymous with a keyword. An example of an algorithm for acquiring a keyword from an operation information sequence will be described later in detail. The keyword acquiring portion 1106 can be realized typically as an MPU, a memory, or the like. Typically, the processing procedure of the keyword acquiring portion 1106 is realized by software, and the software is stored in a storage medium such as a ROM. Note that the processing procedure also may be realized by hardware (dedicated circuit).

In the search range management information storage unit 11061, two or more pieces of search range management information are stored, each of which is a pair of an operation information sequence and search range information, the operation information sequence being two or more pieces of operation information, and the search range information being information of a map range of a keyword that is to be acquired. The search range information also may be information designating a keyword that is to be acquired, or may be information indicating a method for acquiring a keyword. The search range management information is, for example, information that has a refinement search operation information sequence and refinement search target information as a pair, the refinement search target information being information to the effect that a keyword of a destination point is acquired that is a point near the center point of the map output in a centering operation accepted after a zoom-in operation or in a move operation accepted after a zoom-in operation. The search range management information is, for example, information that has a comparison search operation information sequence and comparison search target information as a pair, the comparison search target information being information indicating a region representing a difference between the region of the map output after a zoom-out operation and the region of the map output before the zoom-out operation. The search range management information is, for example, information that has a comparison search operation information sequence and comparison search target information as a pair, the comparison search target information being information indicating a region obtained by excluding the region of the map output before a move operation from the region of the map output after the move operation. The search range management information is, for example, information that has a route search operation information sequence and route search target information as a pair, the route search target information being information to the effect that a keyword of a destination point is acquired that is a point near the center point of the map output in an accepted zoom-in operation or zoom-out operation. Moreover, the refinement search target information is information to the effect that a keyword of a destination point is acquired that is a point near the center point of the map output in a centering operation accepted after a zoom-in operation or in a move operation accepted after a zoom-in operation. The refinement search target information also may include information to the effect that a keyword of a mark point indicating a geographical name is acquired in the map output in a centering operation accepted before the zoom-in operation. Here, the destination point refers to a point that the user wants to look for on the map. The mark point refers to a point that functions as a mark used for reaching the destination point.

The search range management information storage unit 11061 is preferably a non-volatile storage medium, but can be realized also as a volatile storage medium.

The search range information acquiring unit 11062 acquires search range information corresponding to the operation information sequence that is one or more pieces of operation information acquired by the operation information sequence acquiring portion 1105, from the search range management information storage unit 11061. More specifically, if it is judged that the operation information sequence that is one or more pieces of operation information acquired by the operation information sequence acquiring portion 1105 corresponds to the refinement search operation information sequence, the search range information acquiring unit 11062 acquires the refinement search target information. Furthermore, if it is judged that the operation information sequence that is one or more pieces of operation information acquired by the operation information sequence acquiring portion 1105 corresponds to the comparison search operation information sequence, the search range information acquiring unit 11062 acquires the comparison search target information. Moreover, if it is judged that the operation information sequence that is one or more pieces of operation information acquired by the operation information sequence acquiring portion 1105 corresponds to the route search operation information sequence, the search range information acquiring unit 11062 acquires the route search target information. If the search range information acquiring unit 11062 is realized, for example, as software, the refinement search target information also may be a name of a function performing a refinement search. Similarly, the comparison search target information also may be a name of a function performing a comparison search. Similarly, the route search target information also may be a name of a function performing a route search.

The search range information acquiring unit 11062 can be realized typically as an MPU, a memory, or the like. Typically, the processing procedure of the search range information acquiring unit 11062 is realized by software, and the software is stored in a storage medium such as a ROM. Note that the processing procedure also may be realized by hardware (dedicated circuit).

The keyword acquiring unit 11063 acquires one or more keywords from the map information, according to the search range information acquired by the search range information acquiring unit 11062. The keyword acquiring unit 11063 acquires at least a keyword of a destination point corresponding to the refinement search target information acquired by the search range information acquiring unit 11062. The keyword acquiring unit 11063 also acquires a geographical name that is a keyword of a mark point corresponding to the refinement search target information acquired by the search range information acquiring unit 11062. The keyword acquiring unit 11063 acquires at least a keyword corresponding to the comparison search target information acquired by the search range information acquiring unit 11062. The keyword acquiring unit 11063 acquires at least a keyword of a destination point corresponding to the route search target information acquired by the search range information acquiring unit 11062. The keyword acquiring unit 11063 also acquires a geographical name that is a keyword of a mark point corresponding to the route search target information acquired by the search range information acquiring unit 11062. A specific example of the keyword acquiring process performed by the keyword acquiring unit 11063 will be described later in detail. Furthermore, the keyword of the destination point refers to a keyword with which the destination point may be designated. The keyword of the mark point refers to a keyword with which the mark point may be designated.

The keyword acquiring unit 11063 can be realized typically as an MPU, a memory, or the like. Typically, the processing procedure of the keyword acquiring unit 11063 is realized by software, and the software is stored in a storage medium such as a ROM. Note that the processing procedure also may be realized by hardware (dedicated circuit).

The retrieving portion 1107 retrieves information using one or more keywords. Here, it is preferable that the information is a web page on the Internet. Furthermore, the information also may be information inside a database or the like. For example, it is preferable that in a case where the accepting portion 1102 accepts a refinement search operation information sequence, the retrieving portion 1107 retrieves a web page that has the keyword of the destination point in its title and the keyword of the mark point in its page. It is preferable that the retrieving portion 1107 acquires one or more web pages that contain both the keyword of the destination point and the keyword of the mark point, detects two or more terms from each of the one or more web pages that have been acquired, acquires two or more pieces of positional information indicating the positions of the two or more terms from the map information, acquires geographical range information, which is information indicating a geographical range of a description of a web page, for each web page, using the two or more pieces of positional information, and acquires at least a web page in which the geographical range information indicates the smallest geographical range. It is preferable that if one or more web pages that contain both the keyword of the destination point and the keyword of the mark point are acquired, the retrieving portion 1107 acquires one or more web pages that have at least one of the keywords in a title thereof. For example, the retrieving portion 1107 may acquire a web page, or may pass a keyword to a so-called web search engine, start the web search engine, and accept a search result of the web search engine.

The retrieving portion 1107 can be realized typically as an MPU, a memory, or the like. Typically, the processing procedure of the retrieving portion 1107 is realized by software, and the software is stored in a storage medium such as a ROM. Note that the processing procedure also may be realized by hardware (dedicated circuit).

The information output portion 1108 outputs the information retrieved by the retrieving portion 1107. Herein, the output has a concept that includes output to a display, printing in a printer, outputting a sound, transmission to an external apparatus, accumulation in a storage medium, and the like. the information output portion 1108 may be considered to include, or to not include, an output device such as a display or a loudspeaker. The information output portion 1108 can be realized as, for example, driver software for an output device, or a combination of driver software for an output device and the output device.

Next, the operation of the map information processing apparatus will be described with reference to the flowcharts in FIGS. 3 to 8.

(Step S301) The accepting portion 1102 judges whether or not an instruction is accepted from the user. If an instruction is accepted, the procedure proceeds to step S302. If an instruction is not accepted, the procedure returns to step S301.

(Step S302) The map output portion 1103 judges whether or not the instruction accepted in step S301 is a map output instruction. If the instruction is a map output instruction, the procedure proceeds to step S303. If the instruction is not a map output instruction, the procedure proceeds to step S305.

(Step S303) The map output portion 1103 reads the map image information constituting the map information from the map information storage portion 1101.

(Step S304) The map output portion 1103 outputs the map image information read in step S303.

(Step S305) The map output portion 1103 judges whether or not the instruction accepted in step S301 is a map browse operation. If the instruction is a map browse operation of the map, the procedure proceeds to step S306. If the instruction is not a map browse operation of the map, the procedure proceeds to step S313.

(Step S306) The operation information sequence acquiring portion 1105 acquires operation information corresponding to the map browse operation accepted in step S301.

(Step S307) The map output changing portion 1104 changes output of the map according to the map browse operation.

(Step S308) The map output changing portion 1104 stores the operation information acquired in step S306 and output map designating information that is information designating the map output in step S307, as a pair in a buffer. The output map designating information has, for example, a scale ID, which is an ID indicating the scale of the map, and positional information indicating the center point of the output map (e.g., having information of the longitude and the latitude). The output map designating information also may be a scale ID, and positional information at the upper left and positional information at the lower right of a rectangle of the output map. Here, the map output changing portion 1104 may store the operation information and the output map designating information as a pair in a buffer. For example, the output map designating information may be, information designating the scale of the map and positional information of the center point of the output map, or may be bitmap of the output map and positional information of the center point of the output map.

(Step S309) The keyword acquiring portion 1106 performs a keyword acquiring process. The keyword acquiring process will be described in detail with reference to the flowcharts in FIGS. 4 to 7.

(Step S310) The retrieving portion 1107 judges whether or not a keyword has been acquired in step S309. If a keyword has been acquired, the procedure proceeds to step S311. If a keyword has not been acquired, the procedure returns to step S301.

(Step S311) The retrieving portion 1107 searches the information storage apparatuses 12 for information, using the keyword acquired in step S309. An example of this search process will be described in detail with reference to the flowchart in FIG. 8.

(Step S312) The information output portion 1108 outputs the information retrieved in the step S311.

(Step S313) The map output portion 1103 judges whether or not the instruction accepted in step S301 is an end instruction to end the process. If the instruction is an end instruction, the procedure proceeds to step S314. If the instruction is not an end instruction, the procedure proceeds to step S301.

(Step S314) Information such as keywords and operation information inside the buffer is cleared. The process ends.

Next, the keyword acquiring process will be described with reference to the flowchart in FIG. 4.

(Step S401) The search range information acquiring unit 11062 reads the operation information sequence, from a buffer in which the operation information sequence is stored.

(Step S402) The search range information acquiring unit 11062 performs a search range information acquiring process, which is a process of acquiring search range information, using the operation information sequence read in step S401. The search range information acquiring process will be described with reference to the flowchart in FIG. 5.

(Step S403) The keyword acquiring unit 11063 judges whether or not search range information has been acquired in step S402. If search range information has been acquired, the procedure proceeds to step S404. If search range information has not been acquired, the procedure returns to an upper-level function.

(Step S404) The keyword acquiring unit 11063 performs a keyword acquiring process using the search range information acquired in step S402. This keyword acquiring process will be described with reference to the flowcharts in FIGS. 6 and 7. The procedure returns to an upper-level function.

Next, the search range information acquiring process in step S402 will be described with reference to the flowchart in FIG. 5.

(Step S501) The search range information acquiring unit 11062 substitutes 1 for the counter i.

(Step S502) The search range information acquiring unit 11062 judges whether or not the $i^{th}$ search range management information is present in the search range management information storage unit 11061. If the $i^{th}$ search range management information is present, the procedure proceeds to step S503. If the $i^{th}$ search range management information is not present, the procedure returns to an upper-level function.

(Step S503) The search range information acquiring unit 11062 reads the $i^{th}$ search range management information from the search range management information storage unit 11061.

(Step S504) The search range information acquiring unit 11062 substitutes 1 for the counter j.

(Step S505) The search range information acquiring unit 11062 judges whether or not the $j^{th}$ operation information is present in the operation information sequence buffer. If the $j^{th}$ operation information is present, the procedure proceeds to step S506. If the $j^{th}$ operation information is not present, the procedure proceeds to step S511.

(Step S506) The search range information acquiring unit 11062 reads the $j^{th}$ operation information from the operation information sequence buffer.

(Step S507) The search range information acquiring unit 11062 judges whether or not an operation information sequence constituted by operation information up to the $j^{th}$ operation information matches the operation sequence pattern indicated in the $i^{th}$ search range management information.

(Step S508) If it is judged by the search range information acquiring unit 11062 that the operation information sequence matches the operation sequence pattern, the procedure proceeds to step S509. If it is judged that the operation information sequence does not match the operation sequence pattern, the procedure proceeds to step S510.

(Step S509) The search range information acquiring unit 11062 increments the counter j by 1. The procedure returns to step S505.

(Step S510) The search range information acquiring unit 11062 increments the counter i by 1. The procedure returns to step S502.

(Step S511) The search range information acquiring unit 11062 acquires the $i^{th}$ search range management information. The procedure returns to an upper-level function.

Next, the keyword acquiring process using the search range information in step S404 will be described with reference to the flowcharts in FIGS. 6 and 7.

(Step S601) The keyword acquiring unit 11063 judges whether or not the search range information is information for a refinement search operation information sequence (whether or not it is a refinement search). If the condition is satisfied, the procedure proceeds to step S602. If the condition is not satisfied, the procedure proceeds to step S610.

(Step S602) The keyword acquiring unit 11063 judges whether or not the operation information sequence inside the buffer is an operation information sequence indicating that a centering operation [c] has been performed after a zoom-in operation [i]. If this condition is matched, the procedure proceeds to step S603. If this condition is not matched, the procedure proceeds to step S609.

(Step S603) The keyword acquiring unit 11063 reads map information corresponding to the centering operation [c].

(Step S604) The keyword acquiring unit 11063 acquires positional information of the center point of the map image information contained in the map information read in step S603. The keyword acquiring unit 11063 may read the positional information of the center point stored in a pair with the operation information contained in the operation information sequence, or may calculate the positional information of the center point based on information indicating the region of the map image information (e.g., positional information at the upper left and positional information at the lower right of the map image information).

(Step S605) The keyword acquiring unit 11063 acquires a term paired with the positional information that is closest to the positional information of the center point acquired in step S604, as a keyword of the destination point, from the term information contained in the map information read in step S603.

(Step S606) The keyword acquiring unit 11063 acquires map information at the time of a recent centering operation [c] in previous operation information, from the operation information sequence inside the buffer.

(Step S607) The keyword acquiring unit 11063 acquires positional information of the center point of the map image information contained in the map information acquired in step S606.

(Step S608) The keyword acquiring unit 11063 acquires a term paired with the positional information that is closest to the positional information of the center point acquired in step S607, as a keyword of the mark point, from the term information contained in the map information read in step S606. The procedure returns to an upper-level function.

(Step S609) The keyword acquiring unit 11063 judges whether or not the operation information sequence inside the buffer is an operation information sequence indicating that a move operation [m] has been performed after a zoom-in operation [i]. If this condition is matched, the procedure proceeds to step S603. If this condition is not matched, the procedure returns to an upper-level function.

(Step S610) The keyword acquiring unit 11063 judges whether or not the search range information is information for a comparison search operation information sequence. If the condition is satisfied, the procedure proceeds to step S611. If the condition is not satisfied, the procedure proceeds to step S621.

(Step S611) The keyword acquiring unit 11063 judges whether or not the last operation information contained in the operation information sequence inside the buffer is a zoom-out operation [o]. If this condition is matched, the procedure proceeds to step S612. If this condition is not matched, the procedure proceeds to step S618.

(Step S612) The keyword acquiring unit 11063 acquires map information just after the zoom-out operation [o] indicated in the last operation information, from the information inside the buffer.

(Step S613) The keyword acquiring unit 11063 acquires map information just before the zoom-out operation [o], from the information inside the buffer.

(Step S614) The keyword acquiring unit 11063 acquires information indicating a region representing a difference between a region indicated in the map information acquired in step S611 and a region indicated in the map information acquired in step S612.

(Step S615) The keyword acquiring unit 11063 acquires a keyword inside the region identified with the information indicating the region acquired in step S614, from the term information in the map information storage portion 1101. This keyword acquiring process inside the region will be described in detail with reference to the flowchart in FIG. 7.

(Step S616) The keyword acquiring unit 11063 judges whether or not the number of keywords acquired in step S615 is one. If the number of keywords is one, the procedure proceeds to step S617. If the number of keywords is not one, the procedure returns to an upper-level function.

(Step S617) The keyword acquiring unit 11063 extracts a keyword having the highest level of collocation with the one keyword acquired in step S615, from the information storage apparatuses 12. Typically, the keyword acquiring unit 11063 extracts a keyword having the highest level of collocation with the one keyword acquired in step S615, from multiple web pages stored in the one or more information storage apparatuses 12. Here, a technique for extracting a keyword having the highest level of collocation with a keyword from multiple files (e.g., web pages) is a known art, and thus a detailed description thereof has been omitted. The procedure returns to an upper-level function.

(Step S618) The keyword acquiring unit 11063 acquires map information just after the move operation [m] indicated in the last operation information, from the information inside the buffer.

(Step S619) The keyword acquiring unit 11063 acquires map information just before the move operation [m] indicated in the last operation information, from the information inside the buffer.

(Step S620) The keyword acquiring unit 11063 acquires information indicating a region in which a keyword may be present, based on a region indicated in the map information acquired in step S618 and a region indicated in the map information acquired in step S619. An region of a keyword in a case where the move operation [m] functions as a trigger for a comparison search will be described later. The procedure proceeds to step S615.

(Step S621) The keyword acquiring unit 11063 judges whether or not the search range information is information for a route search operation information sequence. If the condition is satisfied, the procedure proceeds to step S622. If the condition is not satisfied, the procedure returns to an upper-level function.

(Step S622) The keyword acquiring unit 11063 acquires screen information just after the zoom-in operation [i] after the zoom-out operation [o].

(Step S623) The keyword acquiring unit 11063 acquires positional information of the center point of the map image information contained in the screen information acquired in step S622.

(Step S624) The keyword acquiring unit 11063 acquires a term paired with the positional information that is closest to the positional information of the center point acquired in step S623, as a keyword, from the term information contained in the map information read in step S622.

(Step S625) The keyword acquiring unit 11063 acquires a keyword of the mark point, as a keyword, in the previous refinement search that is closest to the zoom-in operation [i] after the zoom-out operation [o]. The procedure returns to an upper-level function.

Next, the keyword acquiring process inside the region in step S615 will be described with reference to the flowchart in FIG. 7.

(Step S701) The keyword acquiring unit 11063 substitutes 1 for the counter i.

(Step S702) The keyword acquiring unit 11063 judges whether or not the $i^{th}$ term is present in the term information contained in the corresponding map information. If the $i^{th}$ term is present, the procedure proceeds to step S703. If the $i^{th}$ term is not present, the procedure returns to an upper-level function.

(Step S703) The keyword acquiring unit 11063 substitutes 1 for the counter j.

(Step S704) The keyword acquiring unit 11063 judges whether or not the $j^{th}$ region is present. If the $j^{th}$ region is present, the procedure proceeds to step S705. If the $j^{th}$ region is not present, the procedure proceeds to step S708. Here, each region is typically a rectangular region.

(Step S705) The keyword acquiring unit 11063 judges whether or not the $i^{th}$ term is a term that is present inside the $j^{th}$ region. Here, for example, the keyword acquiring unit 11063 reads positional information (e.g., $(a_i, b_i)$) paired with the $i^{th}$ term, and judges whether or not this positional information represents a point inside the region represented as the $j^{th}$ region $((a_x, b_x), (a_y, b_y))$ (where $(a_x, b_x)$ refers to a point at the upper left in the rectangle, and $(a_y, b_y)$ refers to a point at the lower right in the rectangle). That is to say, if the conditions '$a_x <= a_i <= a_y$' and '$b_x <= b_i <= b_y$' are satisfied, the keyword acquiring unit 11063 judges that the $i^{th}$ term is present inside the $j^{th}$ region. If the conditions are not satisfied, it is judged that the $i^{th}$ term is present outside the $j^{th}$ region.

(Step S706) If it is judged by the keyword acquiring unit 11063 that the $i^{th}$ term is present inside the $j^{th}$ region, the procedure proceeds to step S707. If it is judged that the $i^{th}$ term is not present inside the $j^{th}$ region, the procedure proceeds to step S709.

(Step S707) The keyword acquiring unit 11063 registers the $i^{th}$ term as a keyword. Here, the register refers to an operation to store data on a given memory. The procedure proceeds to step S708.

(Step S708) The keyword acquiring unit 11063 increments the counter i by 1. The procedure returns to step S702.

(Step S709) The keyword acquiring unit 11063 increments the counter j by 1. The procedure returns to step S704.

Next, an example of the search process in step S311 will be described in detail with reference to the flowchart in FIG. 8.

(Step S801) The retrieving portion 1107 judges whether or not the search range information is information for a refinement search operation information sequence (whether or not it is a refinement search). If the condition is satisfied, the procedure proceeds to step S802. If the condition is not satisfied, the procedure proceeds to step S808.

(Step S802) The retrieving portion 1107 substitutes 1 for the counter i.

(Step S803) The retrieving portion 1107 searches the one or more information storage apparatuses 12, and judges whether or not the $i^{th}$ information (e.g., web page) is present. If the $i^{th}$ information is present, the procedure proceeds to step S804. If the $i^{th}$ information is not present, the procedure returns to an upper-level function.

(Step S804) The retrieving portion 1107 acquires the keyword of the destination point and the keyword of the mark point present on the memory, and judges whether or not the $i^{th}$ information contains the keyword of the destination point in its title (e.g., inside the <title> tag) and the keyword of the mark point in its body (e.g., inside the <body> tag).

(Step S805) If it is judged by the retrieving portion 1107 in step S804 that the condition is matched, the procedure proceeds to step S806. If it is judged that the condition is not matched, the procedure proceeds to step S807.

(Step S806) The retrieving portion 1107 registers the $i^{th}$ information as information that is to be output.

(Step S807) The retrieving portion 1107 increments the counter i by 1. The procedure returns to step S803.

(Step S808) The retrieving portion 1107 judges whether or not the search range information is information for a comparison search operation information sequence. If the condition is satisfied, the procedure proceeds to step S809. If the condition is not satisfied, the procedure proceeds to step S817.

(Step S809) The retrieving portion 1107 substitutes 1 for the counter i.

(Step S810) The retrieving portion 1107 searches the one or more information storage apparatuses 12, and judges whether or not the $i^{th}$ information (e.g., web page) is present. If the $i^{th}$ information is present, the procedure proceeds to step S811. If the $i^{th}$ information is not present, the procedure proceeds to step S816.

(Step S811) The retrieving portion 1107 acquires two keywords present on the memory, and judges whether or not the $i^{th}$ information contains one of the keywords in its title (e.g., inside the <title> tag) and the other keyword in its body (e.g., inside the <body> tag).

(Step S812) If it is judged by the retrieving portion 1107 in step S810 that the condition is matched, the procedure proceeds to step S813. If it is judged that the condition is not matched, the procedure proceeds to step S815.

(Step S813) The retrieving portion 1107 acquires the MBR of the $i^{th}$ information. The MBR (minimum bounding rectangle) refers to information indicating a region of interest in the $i^{th}$ information, and obtained by retrieving two or more terms contained in the term information from the $i^{th}$ information (e.g., web page) and using two or more pieces of positional information of the two or more terms that have been retrieved. The MBR is, for example, a rectangular region constituted by two pieces of positional information furthest from each other, among two or more pieces of positional information corresponding to the two or more terms that have been retrieved. In this case, the MBR is information of a rectangular region identified with two points (e.g., positional information at the upper left and positional information at the lower right). Here, the MBR is described in Non-Patent Document 10.

(Step S814) The retrieving portion 1107 registers the $i^{th}$ information and the MBR (e.g., positional information of the two points).

(Step S815) The retrieving portion 1107 increments the counter i by 1. The procedure returns to step S810.

(Step S816) The retrieving portion 1107 reads pairs of the information and the MBR that have been registered (that are present on the memory), acquires information with the smallest MBR, and registers the information as information that is to be output. Here, a technique in which if the MBR is a rectangular region designated with positional information of two points, the sizes of the areas of the rectangular regions are compared, and information (e.g., web page) paired with the MBR with the smallest area is acquired is a known art, and thus a detailed description thereof has been omitted.

(Step S817) The retrieving portion 1107 judges whether or not the search range information is information for a route search operation information sequence. If the condition is satisfied, the procedure proceeds to step S818. If the condition is not satisfied, the procedure returns to an upper-level function.

(Step S818) The retrieving portion 1107 substitutes 1 for the counter i.

(Step S819) The retrieving portion 1107 searches the one or more information storage apparatuses 12, and judges whether or not the $i^{th}$ information (e.g., web page) is present. If the $i^{th}$ information is present, the procedure proceeds to step S820. If the $i^{th}$ information is not present, the procedure proceeds to step S823.

(Step S820) The retrieving portion 1107 acquires the MBR of the $i^{th}$ information.

(Step S821) The retrieving portion 1107 registers the $i^{th}$ information and the MBR (e.g., positional information of the two points).

(Step S822) The retrieving portion 1107 increments the counter i by 1. The procedure returns to step S819.

(Step S823) The retrieving portion 1107 acquires screen information just after the zoom-in operation [i] just after the zoom-out operation [o] in the operation information sequence buffer.

(Step S824) The retrieving portion 1107 acquires positional information of the center point of the map indicated in the map image information contained in the screen information acquired in step S823.

(Step S825) The retrieving portion 1107 acquires positional information of the center point of the map indicated in the map image information contained in the screen information in the latest route search.

(Step S826) The retrieving portion 1107 acquires information having the MBR that is closest to the MBR constituted by the positional information of the point acquired in step S824 and the positional information of the point acquired in step S825, and registers the information as information that is to be output. In this case, the retrieving portion 1107 searches a group of pairs of the MBR and the information registered in step S821, and acquires information having the MBR that is closest to the MBR constituted by the positional information of the point acquired in step S824 and the positional information of the point acquired in step S825.

In the description above, an example of the search process was described in detail with reference to the flowchart in FIG. 8. However, as the search process, only a process of passing a keyword to a so-called web search engine and operating the search engine may be performed.

Furthermore, the retrieving portion 1107 may perform a process of constructing an SQL sentence based on the keywords acquired by the keyword acquiring unit 11063, and searching the database using the SQL sentence. Here, there is no limitation on the method for combining keywords (AND, OR usage method) in the construction of an SQL sentence.

Hereinafter, a specific operation the map information processing apparatus 11 in this embodiment will be described.

FIG. 1 is a conceptual diagram of the map information processing system that has the map information processing apparatus 11. In this example, if the user performs operations on the map, the map information processing apparatus 11 can automatically acquire web information matching a purpose of the map operations, without requiring the user to be conscious of search. Furthermore, in this specific example, a meaningful operation sequence of map operations is referred to as a chunk.

First, in the map information storage portion 1101, the map image information shown in FIG. 9 is held. The map image information is stored in a pair with information (scale A, scale B, etc.) identifying the scale of the map. Furthermore, in the map information storage portion 1101, the term information shown in FIG. 10 is held. That is to say, in the map information storage portion 1101, map image information for each different scale and term information for each different scale is stored.

In the search range management information storage unit 11061, the atomic operation chunk management table shown in FIG. 11 and the complex operation chunk management table shown in FIG. 12 are stored. The atomic operation chunk is the smallest unit of an operation sequence for obtaining a purpose of the user. The atomic operation chunk management table has the attributes 'ID', 'purpose identifying information', 'user operation', and 'symbol'. The 'ID' is information identifying records, and is for record management in the table. The 'purpose identifying information' is information identifying five types of atomic operation chunks. There are five types of atomic operation chunks, namely chunks for single-point specification, multiple-point specification, selection specification, surrounding-area specification, and wide-area specification. The single-point specification is an operation to uniquely determine and zoom in on a target, and used, for example, in order to look for accommodation at the travel destination. The multiple-point specification is an operation to zoom out from a designated target, and used, for example, in order to look for the location of a souvenir shop near the accommodation. The selection specification is an operation to perform centering of multiple points, and used, for example, in order to sequentially select tourist spots at the travel destination. The surrounding-area specification is an operation to perform a zoom-out to display multiple points on one screen, and used, for example, in order to check the positional relationship between the tourist spots which the user wants to visit. The wide-area specification is an operation to cause movement along multiple points, and used, for example, in order to check how far the distance is between the town where the user lives and the travel destination. The 'user operation' refers to an operation information sequence in a case where the user performs map browse operations. The 'symbol' refers to a symbol identifying an atomic operation chunk.

Furthermore, in the map information processing apparatus 11 in this example, retrieval of information containing a purpose of the user is realized by identifying a complex operation chunk in which atomic operation chunks are connected. The complex operation chunk management table is a management table for realizing this retrieval. The complex operation chunk management table has the attributes 'ID', 'purpose identifying information', 'combination of atomic operation chunks', 'trigger', and 'user operation'. The 'ID' is information identifying records, and is for record management in the table. The 'purpose identifying information' is information identifying three types of complex operation chunks. The 'combination of atomic operation chunks' is information of methods for combining atomic operation chunks. In this example, there are three types of methods for connecting atomic operation chunks. The 'overlaps' refers to a connection method in which operations at the connecting portion are the same. The 'meets' refers to a connection method in which operations at the connecting portion are different from each other. The 'after' refers to a connection method indicating that another operation may be interposed between operations. The 'trigger' refers to a trigger to find a keyword. Here, 'a include_in B' refers to an operation a contained in a chunk B. Furthermore, 'a just_after b' refers to the operation a performed just after an operation b. That is to say, 'a just_after b' indicates that the operation a performed just after the operation b functions as a trigger. Furthermore, 'user operation' refers to an operation information sequence in a case where the user performs map browse operations. Here, for example, the operation information sequence stored in the search range management information storage unit 11061 is the 'user operation' in FIG. 12, and the search range information is the 'purpose identifying information' in FIG. 12. For example, the keyword acquiring unit 11063 of the map information processing apparatus 11 executes a function corresponding to the value of 'purpose identifying information' and acquires a keyword.

There are three types of complex operation chunk search, namely a refinement search, a comparison search, and a route search. The refinement search is the most basic search in which one arbitrary point is determined, and this point is taken as the search target. The comparison search is search in which the relationship between arbitrary points is judged, and used, for example, in a case where search is performed for the positional relationship between the accommodation at the travel destination and the nearest station. The route search is search performed by the user along the route, and used, for example, in a case where search is performed for what are on the path from the nearest station to the accommodation, and how to reach the destination.

Furthermore, it is assumed that a large number of web pages are stored in the one or more information storage apparatuses 12 constituting the map information processing system.

In the status described above, a specific operation example will be described in which keywords used for information retrieval are acquired based on a map browse operation sequence, which is multiple operations to browse the map, and then a web page is retrieved.

Specific Example 1

In Specific Example 1, information retrieval and output in the case of a refinement search will be described. In a refinement search, the user performs a zoom-in operation to determine a search point. Thus, a trigger to acquire a keyword is, for example, a zoom-in operation [i]. Furthermore, in a refinement search, for example, a move operation [m] or a centering operation [c] after the zoom-in operation may function as a trigger to acquire a keyword.

First, a process of obtaining a purpose of the user who performs operations based on a map browse operation sequence, which is a process leading to keyword acquisition, will be described. The map browse operation includes zooming operations (a zoom-in operation [i] and a zoom-out operation [o]) and move operations (a move operation [m] and a centering operation [c]). An operation sequence that is fixed to some extent can be detected in a case where the user performs map operations with a purpose. For example, in a case where the user considers traveling to Okinawa, and tries to display Shuri Castle on a map, first, the user moves the on-screen map so that Okinawa is positioned at the center of the screen, and then displays Shuri Castle with a zoom-in operation or a move operation. Furthermore, it seems that in order to look for the nearest station to Shuri Castle on the on-screen map, the user performs a zoom-out operation from Shuri Castle to look for the nearest station, and displays the found station and Shuri Castle on one screen.

First, the user starts the map information processing apparatus 11 and inputs a map output instruction. Then, the accepting portion 1102 accepts the map output instruction. The map output portion 1103 reads map information from the map information storage portion 1101, and outputs the map information, for example, as shown in FIG. 13. Here, the map information may be stored in advance in the information storage apparatuses 12 or another apparatus, or may be held in the map information processing apparatus 11. The left side on the screen in FIG. 13 is a map of Kyoto Prefecture. The right side in FIG. 13 is a region to which information retrieved by the retrieving portion 1107 is output. Furthermore, in FIG. 13, there are a 'zoom-in' button, a 'zoom-out' button, and upper, lower, left, and right arrow buttons. It is assumed that if the 'zoom-in' button is pressed down, operation information [i] is generated, if the 'zoom-out' button is pressed down, operation information [o] is generated, if the upper, lower, left, or right arrow button is pressed down, operation information [m] is generated, and if an arbitrary position in the map information is pressed down, operation information [c] to perform centering to the pressed position is generated.

It is assumed that the user successively performs map operations, that is, presses down the 'zoom-in' button, performs the 'centering' operation, presses down the 'zoom-in' button, and then presses down the 'zoom-in' button. FIG. 14 shows this status. In FIG. 14, the output of the map is changed in the order of arrows from (a) to (e). Here, in FIG. 14, the information ([i] or [c]) next to the arrows is operation information.

In a case where the user performs the map operations as shown in FIG. 14, the operation information sequence acquiring portion 1105 acquires operation information corresponding to the accepted map browse operations, and temporarily stores the information in the buffer. Furthermore, the map output changing portion 1104 changes the output of the map according to the map browse operations. Then, the map output changing portion 1104 acquires map information after the change (e.g., information identifying the scale of the output map, and positional information of the center point of the output map), and stores the map information in the buffer. Then, the buffer as shown in FIG. 15 is obtained. In the buffer, 'operation information', 'map information', 'center position', 'search', and 'keyword' are stored in association with each other. The 'search' refers to a purpose of the user described above, and any one of 'refinement search' 'comparison search' and 'route search' may be entered as the 'search'. As the 'keyword', a keyword acquired by the keyword acquiring unit 11063 may be entered.

Next, the keyword acquiring portion 1106 tries to acquire a keyword each time the accepting portion 1102 accepts a map operation from the user. However, the operation information sequence does not match a trigger to acquire a keyword, and thus a keyword has not been acquired yet.

It is assumed that the user then further performs a centering operation [c]. Next, the map output changing portion 1104 changes output of the map according to the map browse operation. Then, the map output changing portion 1104 acquires map information after the change (e.g., information identifying the scale of the output map, and positional information of the center point of the output map), and stores the map information in the buffer. Next, the operation information sequence acquiring portion 1105 obtains the operation information sequence [iciic].

Next, the keyword acquiring unit 11063 searches the table in FIG. 12 based on the operation information sequence [iciic], and judges that the operation information sequence matches 'refinement search'. That is to say, here, the operation information sequence matches the trigger to acquire a keyword. Then, the keyword acquiring unit 11063 acquires the scale ID 'scale D' and the information of the center position (XD2, YD2) corresponding to the last [c].

The keyword acquiring unit 11063 acquires the information of the center position (XD2, YD2). It is assumed that the keyword acquiring unit 11063 then searches term information corresponding to the scale ID 'scale D', and acquires the term 'Kitano-Tenmangu Shrine' that is closest to the positional information (XD2, YD2).

Next, the keyword acquiring unit 11063 acquires the scale ID 'scale B' and the center position (XB2, YB2) at the time of a recent centering operation [c] in previous operation information, from the operation information sequence inside the buffer.

Next, the keyword acquiring unit 11063 searches term information corresponding to 'scale B', and acquires the term 'Kamigyo-ward' that is closest to the positional information (XB2, YB2).

With the above-described process, the keyword acquiring unit 11063 has acquired the keywords 'Kitano-Tenmangu Shrine' and 'Kamigyo-ward'. Here, the keyword 'Kitano-Tenmangu Shrine' is a keyword of the destination point, and 'Kamigyo-ward' is a keyword of the mark point. The keyword acquiring unit 11063 writes the search 'refinement search' and the keywords 'Kitano-Tenmangu Shrine' and 'Kamigyo-ward' to the buffer. FIG. 16 shows the data inside this buffer. Furthermore, in FIG. 16, the numeral (1) in the keyword '(1) Kitano-Tenmangu Shrine' indicates that this keyword is a keyword of the destination point, and the numeral (2) in the keyword '(2) Kamigyo-ward' indicates that this keyword is a keyword of the mark point.

Next, a process of searching a web page using the keywords 'Kitano-Tenmangu Shrine' and 'Kamigyo-ward' will be described. The retrieving portion 1107 judges that the search range information has a refinement search operation information sequence (it is a refinement search), and acquires a web page that contains 'Kitano-Tenmangu Shrine' in its title (inside the <title> tag) and 'Kamigyo-ward' in its body (inside the <body> tag). The information output portion 1108 outputs a website of 'Kitano-Tenmangu Shrine' to the right side on the screen as shown in FIG. 17.

Specific Example 2

In Specific Example 2, information retrieval and output in the case of a comparison search will be described. It seems that in a comparison search, the user performs a zoom-out operation [o] or a move operation [m] to present multiple arbitrary points on the screen. Thus, a trigger to acquire a keyword is typically a zoom-out operation [o] or a move operation [m].

It is assumed that from the state of the buffer in FIG. 16, the user successively performs a move operation [m] and a zoom-out operation [o].

Next, the operation information sequence acquiring portion 1105 acquires operation information corresponding to the accepted map browse operations, and temporarily stores the information in the buffer. Furthermore, the map output changing portion 1104 changes output of the map according to the map browse operations. Then, the map output changing portion 1104 acquires map information after the change (e.g., information identifying the scale of the output map, and positional information of the center point of the output map), and stores the map information in the buffer.

Next, the keyword acquiring unit 11063 searches the table in FIG. 12 based on the operation information sequence [ici-icmo], and judges that the operation information sequence matches 'comparison search'. Then, the keyword acquiring unit 11063 acquires the scale ID 'scale C' and the information of the center position (XC2, YC2) corresponding to the last [o].

Next, the keyword acquiring unit 11063 acquires the scale ID 'scale D' and the information of the center position (XD3, YD3) before the zoom-out operation [o]. Then, the keyword acquiring unit 11063 acquires information indicating a region [R(o)] representing a difference between a region [$O_{last}$] indicated in the map information ('scale C', (XC2, YC2)) and a region [$O_{last-1}$] indicated in the map information ('scale D', (XD3, YD3)). FIG. 19 shows a conceptual diagram thereof. In FIG. 19, the meshed portion indicating the region representing the difference between the region after the zoom-out and the region before the zoom-out is the region [R(o)] in which a keyword may be present. That is to say, '[R(O)]=[$O_{last}$]−[$O_{last-1}$]'.

Next, the keyword acquiring unit 11063 judges whether or not among points designated by the positional information contained in the term information in the map information storage portion 1101, there is a point contained inside the region [R(o)]. The keyword acquiring unit 11063 acquires a term corresponding to the positional information of that point, as a keyword. It is assumed that the keyword acquiring unit 11063 has acquired the keyword 'Kinkaku-ji Temple'.

Next, the keyword acquiring unit 11063 acquires the previously acquired keyword 'Kitano-Tenmangu Shrine' of the destination point.

As described above, the keyword acquiring unit 11063 has acquired the keywords 'Kinkaku-ji Temple' and 'Kitano-Tenmangu Shrine' in the comparison search.

Next, the retrieving portion 1107 retrieves a web page that contains the keywords 'Kinkaku-ji Temple' and 'Kitano-Tenmangu Shrine' and has the smallest MBR, from the information storage apparatuses 12. Then, the information output portion 1108 outputs the web page retrieved by the retrieving portion 1107, as shown in FIG. 20.

Here, in the comparison search, in a case where the last operation information is a move operation [m], if the map information after the last move operation is taken as ($m_{last}$) and the map information before the move operation is taken as ($m_{last-1}$), a map range (R(m)) in which at least one keyword is contained is '$R(m)=m_{last}-(m_{last} \cap m_{last-1})$'. Furthermore, since the user will want to display comparison targets as large as possible, keywords for the comparison targets seem to be present in the region '$R(m0)=R(m) \cup R(m')$'. Here, R(m') refers to a range obtained by turning R(m) about the center of the map. This map range is shown in the drawing as {hatched portion A ∪ hatched portion B} in FIG. 21. These map ranges are ranges in which keywords are present. FIG. 21 shows that the output map has moved from the left large rectangle to the right large rectangle. The region of R(m) is 'A' in FIG. 21, and the region of R(m') is 'B' in FIG. 21. The region (R(m0)) in which a keyword may be present is the region 'A' or 'B'.

Specific Example 3

In Specific Example 3, information retrieval and output in the case of a route search will be described. It seems that in a route search, the user performs a zoom-in operation [i] while confirming an outline of the route with a zoom-out operation [o], and causes movement along the route that the user follows while performing a centering operation [c]. Thus, the centering operation [c] after the confirmation operation (the zoom-in operation [i] after the zoom-out operation [o] is the confirmation operation) typically functions as a trigger to acquire a keyword.

It is assumed that from the state of the buffer in FIG. 18, the user successively performs a centering operation [c], a zoom-out operation [o], a zoom-in operation [i], and a centering operation [c].

Next, the operation information sequence acquiring portion 1105 acquires operation information corresponding to the accepted map browse operations, and temporarily stores the information in the buffer. Furthermore, the map output changing portion 1104 changes output of the map according to the map browse operations. Then, the map output changing portion 1104 acquires map information after the change (e.g., information identifying the scale of the output map, and positional information of the center point of the output map), and stores the map information in the buffer.

Next, the keyword acquiring unit 11063 searches the table in FIG. 12 based on the operation information sequence [ici-icmocoic] and judges that the operation information sequence matches 'route search'. Then, the keyword acquiring unit 11063 acquires the scale ID 'scale C' and the information of the center position (XC5, YC5) corresponding to the last [c].

Next, the keyword acquiring unit 11063 acquires, as a keyword, the term 'Kitano Hakubai-cho' paired with the positional information that is closest to the information of the center position (XC5, YC5), among points designated by the positional information contained in the term information corresponding to the scale ID 'scale C', in the map information storage portion 1101. Next, the keyword acquiring unit 11063 also acquires the keyword 'Kitano-Tenmangu Shrine' of the destination point in the latest refinement search. With the above-described process, the buffer content in FIG. 22 is obtained.

As described above, the keyword acquiring unit 11063 has acquired the keywords 'Kitano Hakubai-cho' and 'Kitano-Tenmangu Shrine' in the route search.

Next, the retrieving portion 1107 acquires each piece of information in the information storage apparatuses 12, and calculates the MBR of each piece of information that has been acquired.

Next, the retrieving portion 1107 calculates the MBR of the keywords based on the keywords 'Kitano Hakubai-cho' and 'Kitano-Tenmangu Shrine', and determines information having the MBR that is closest to this MBR of the keywords, as information that is to be output.

Then, the information output portion 1108 outputs the information (web page) acquired by the retrieving portion 1107, as shown in FIG. 23.

As described above, according to this embodiment, it is possible to provide appropriate information, by automatically detecting an operation sequence performed by the user on a map.

Furthermore, according to this embodiment, it is possible to acquire keywords timely and effectively, and to obtain information that the user desires, by specifically prescribing the atomic operation chunks and the complex operation chunks as the operation information sequences, and acquiring keywords if an operation information sequence matches a designated complex operation chunk.

It should be noted that according to this embodiment, a navigation system including the map information processing apparatus can be constituted. With this navigation system, for example, desired information (web page, etc.) can be automatically obtained when driving, and thus driving can be significantly assisted.

In this embodiment, as specific examples of the operation information sequence, the single-point specifying operation information sequence, the multiple-point specifying operation information sequence, the selection specifying operation information sequence, the surrounding-area specifying operation information sequence, and the wide-area specifying operation information sequence, and the combinations of the five types of operation information sequences (the refinement search operation information sequence, the comparison search operation information sequence, and the route search operation information sequence) were shown. Furthermore, in this embodiment, examples of the trigger to acquire a keyword for each operation information sequence was clearly shown. However, the operation information sequence in a case where a keyword is acquired or the trigger to acquire a keyword is not limited to those described above.

Furthermore, in this embodiment, the map information processing apparatus may be an apparatus that only processes a map browse operation sequence and retrieves information, and another apparatus may display the map or change display of the map. The map information processing apparatus in this case is a invention is directed to a map information processing apparatus, comprising: a map information storage portion in which map information, which is information of a map, can be stored; an accepting portion that accepts a map browse operation sequence, which is multiple operations to browse the map; an operation information sequence acquiring portion that acquires an operation information sequence, which is information of multiple operations corresponding to the map browse operation sequence; a keyword acquiring portion that acquires at least one keyword from the map information using the operation information sequence; a retrieving portion that retrieves information using the at least one keyword; and an information output portion that outputs the information retrieved by the retrieving portion. Furthermore, in this map information processing apparatus, the map of the map information storage portion may be present in an external apparatus, and the map information processing apparatus may perform a process of acquiring the map information from the external apparatus.

The process in this embodiment may be realized by software. The software may be distributed by software downloading or the like. The software may be distributed in the form where the software is stored in a storage medium such as a CD-ROM. Note that the same is applied to other embodiments described in this specification. The software that realizes the map information processing apparatus in this embodiment may be a following program. Specifically, this program is a program for causing a computer to execute: an accepting step of accepting a map browse operation sequence, which is multiple operations to browse a map; an operation information sequence acquiring step of acquiring an operation information sequence, which is information of multiple operations corresponding to the map browse operation sequence; a keyword acquiring step of acquiring at least one keyword from stored map information, using the operation information sequence; a retrieving step of retrieving information using the at least one keyword; and an information output step of outputting the information retrieved in the retrieving step.

Furthermore, in this program, it is preferable that an instruction to output the map is also accepted in the accepting step, and the program causes the computer to further execute: a map output step of reading the map information and outputting the map in a case where an instruction to output the map is accepted in the accepting step; and a map output changing step of changing output of the map according to a map browse operation in a case where the map browse operation is accepted in the accepting step.

Furthermore, in this program, it is preferable that at least two pieces of search range management information are stored, each of which is a pair of an operation information sequence and search range information, which is information of a map range of a keyword that is to be acquired, and the keyword acquiring step comprises: a search range information acquiring step of acquiring search range information corresponding to the operation information sequence that is at least one piece of operation information acquired in the operation information sequence acquiring step; and a keyword acquiring step of acquiring at least one keyword from the map information, according to the search range information acquired in the search range information acquiring step.

Furthermore, in the foregoing embodiments, each processing (each function) may be realized as integrated processing using a single apparatus (system), or may be realized as distributed processing using multiple apparatuses.

FIG. 24 shows the external appearance of a computer that executes the programs described in this specification to realize the map information processing apparatus in the foregoing various embodiments. The foregoing embodiments can be realized by computer hardware and a computer program executed thereon. FIG. 24 is a schematic view of a computer system 340. FIG. 25 is a block diagram of the computer system 340.

In FIG. 24, the computer system 340 includes a computer 341 including an FD (flexible disk) drive and a CD-ROM (compact disk read only memory) drive, a keyboard 342, a mouse 343, and a monitor 344.

In FIG. 25, the computer 341 includes not only the FD drive 3411 and the CD-ROM drive 3412, but also a CPU (central processing unit) 3413, a bus 3414 that is connected to the CPU 3413, the CD-ROM drive 3412, and the FD drive 3411, a ROM (read only memory) 3415 in which a program such as a startup program is to be stored, a RAM (random access memory) 3416 that is connected to the CPU 3413, and in which a command of an application program is temporarily stored and a temporary storage area is to be provided, and a hard disk 3417 in which an application program, a system program, and data are to be stored. Although not shown, the computer 341 may further include a network card that provides connection to a LAN.

The program for causing the computer system 340 to execute the functions of the map information processing apparatus in the foregoing embodiments may be stored in a CD-ROM 3501 or an FD 3502, inserted into the CD-ROM drive 3412 or the FD drive 3411, and transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program for causing the computer 341 to execute the functions of the map information processing apparatus in the foregoing embodiments. The program may only include a command portion to call an appropriate function (module) in a controlled mode and obtain desired results. The manner in which the computer system 340 operations is well known, and thus a detailed description thereof has been omitted.

Furthermore, in the foregoing embodiments, each constituent element may be constituted by dedicated hardware, or alternatively, constituent elements that can be realized as software may be realized by executing a program. For example, each constituent element may be realized by a program execution portion such as a CPU reading and executing a software program stored in a storage medium such as a hard disk or a semiconductor memory.

It should be noted that in the program, in a transmitting step of transmitting information, a receiving step of receiving information, or the like, processing that is performed by hardware, for example, processing performed by a modem, an interface card, or the like in the transmitting step (processing that can only be performed by hardware) is not included.

Furthermore, this program may be executed by downloading from a server or the like, or may be executed by reading a program stored in a given storage medium (e.g., an optical disk such as a CD-ROM, a magnetic disk, a semiconductor memory, etc.).

Furthermore, the computer that executes this program may be a single computer, or may be multiple computers. More specifically, centralized processing may be performed, or distributed processing may be performed.

Furthermore, in the foregoing embodiments, it would be appreciated that two or more communication units (an information transmitting portion, etc.) in one apparatus may be physically realized as one medium.

The present invention is not limited to the embodiments set forth herein. Various modifications are possible within the scope of the present invention.

INDUSTRIAL APPLICABILITY

As described above, the map information processing apparatus according to the present invention has the effect that appropriate information can be provided by automatically detecting an operation sequence performed by a user on a map, and thus this apparatus is useful, for example, as a navigation system.

BRIEF DESCRIPTION OF THE DRAWINGS

FIG. 10 is a diagram showing a term information in the embodiment.

FIG. 11 is a diagram showing an atomic operation chunk management table in the embodiment.

FIG. 12 is a diagram showing a complex operation chunk management table in the embodiment.

FIG. 15 is a diagram showing an example of the data structure inside a buffer in the embodiment.

FIG. 16 is a diagram showing an example of the data structure inside the buffer in the embodiment.

Figure 17:
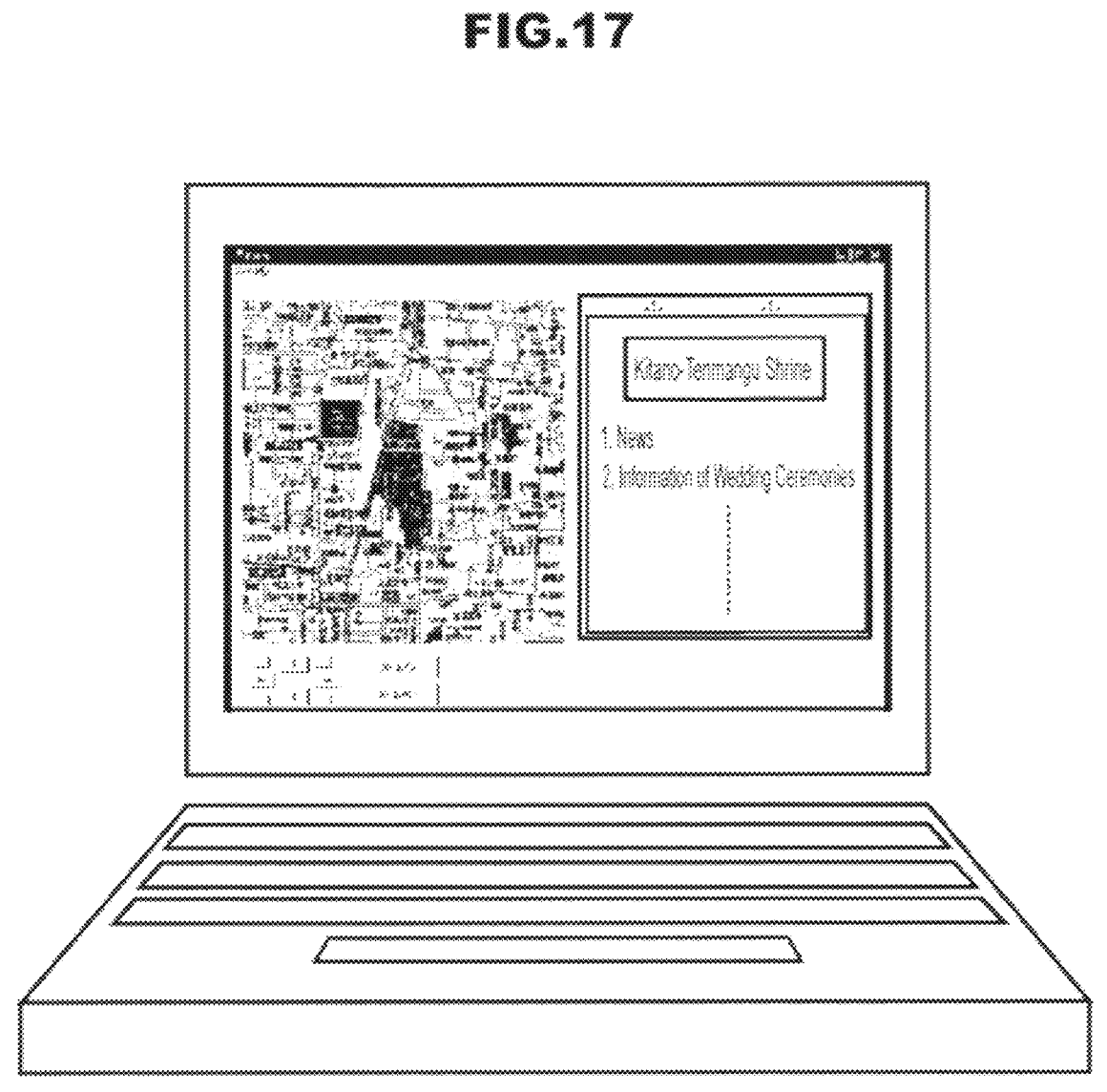

FIG. 17 is a view showing an example of information retrieved by a retrieving portion in the embodiment.

FIG. 18 is a diagram showing an example of the data structure inside the buffer in the embodiment.

FIG. 22 is a diagram showing an example of the data structure inside the buffer in the embodiment.

LIST OF REFERENCE NUMERALS

Figure 1:
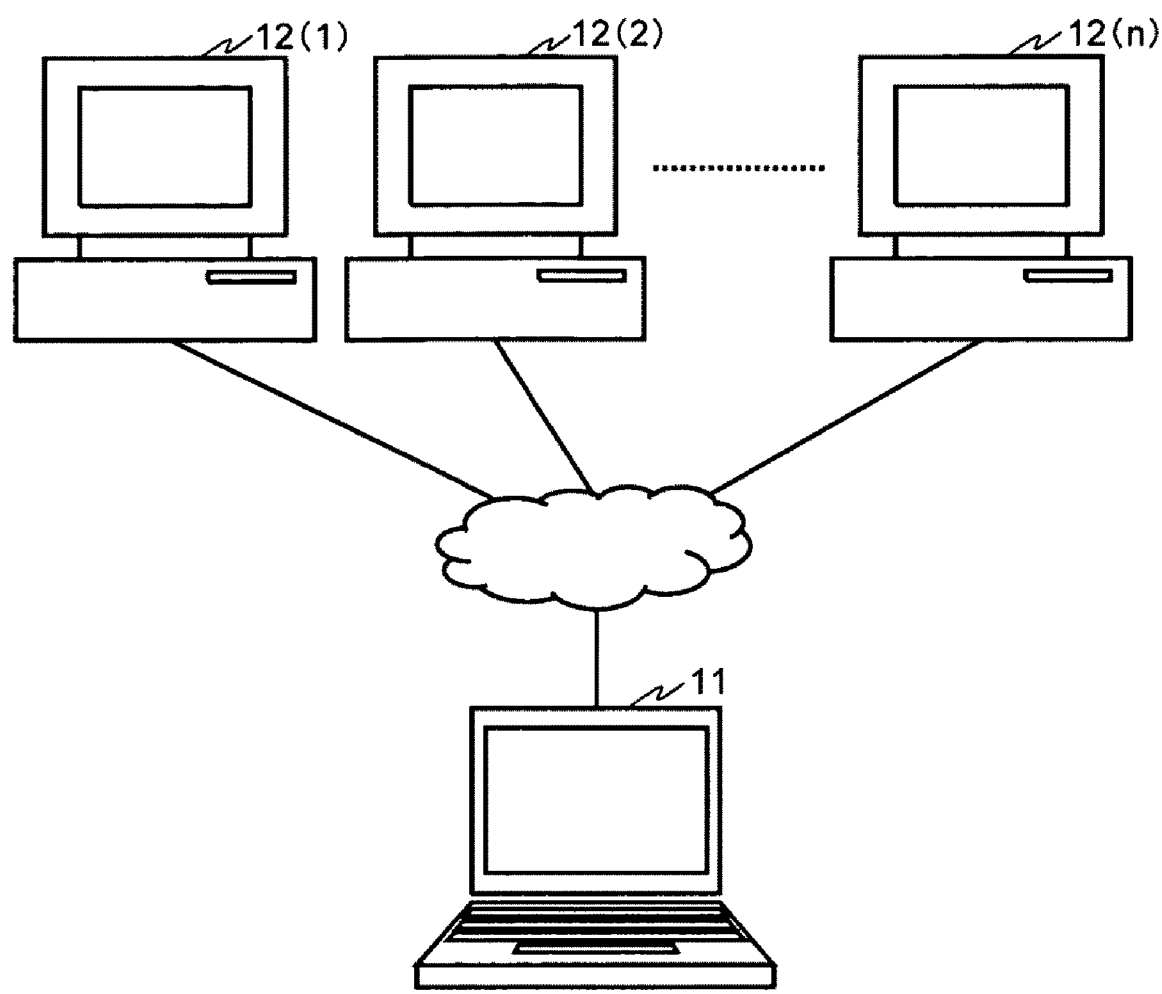
FIG. 1 is a view showing a map information processing system in an embodiment.
Figure 2:
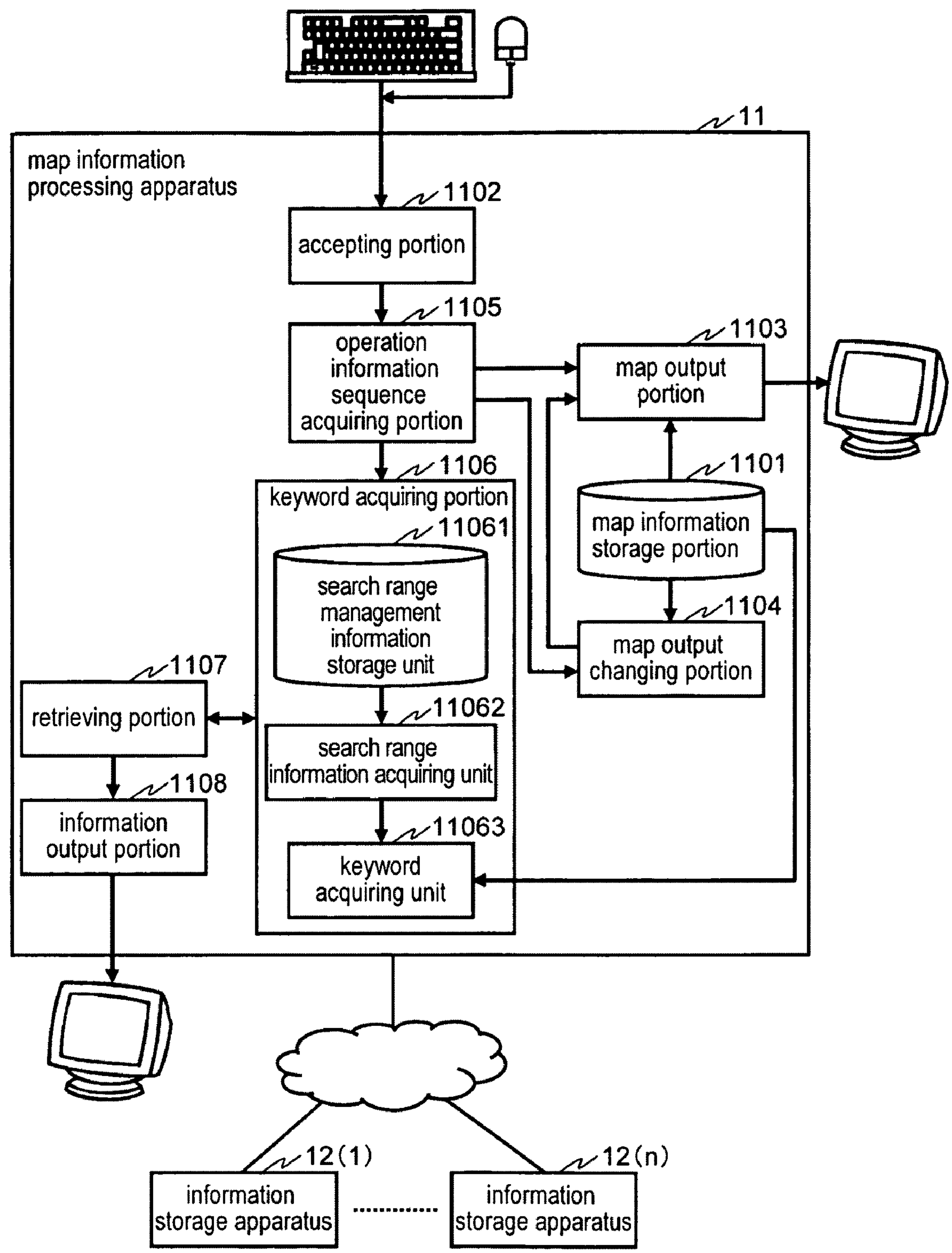
FIG. 2 is a block diagram of the map information processing system in the embodiment.
Figure 3:
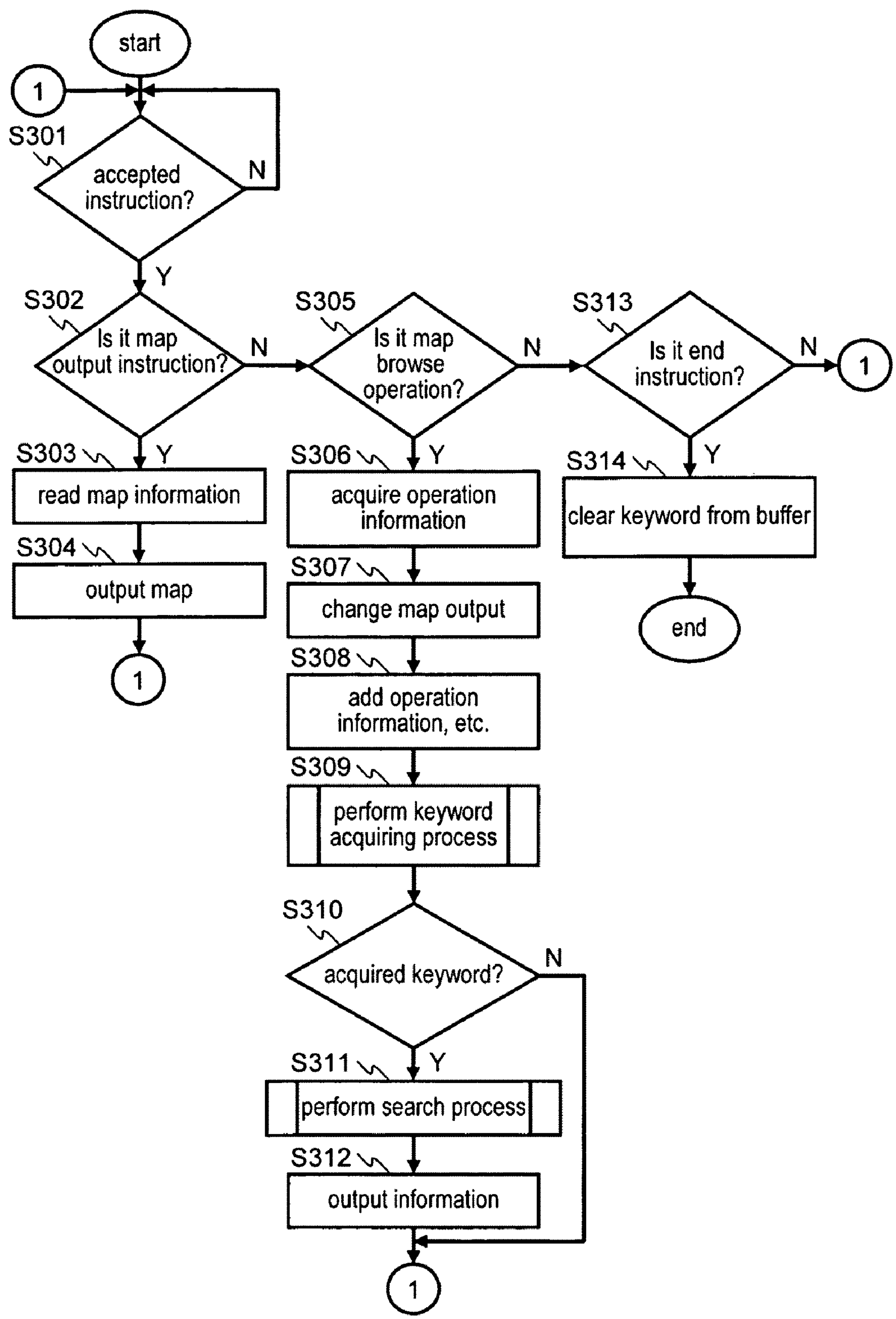
FIG. 3 is a flowchart illustrating an operation of a map information processing apparatus in the embodiment.
Figure 4:
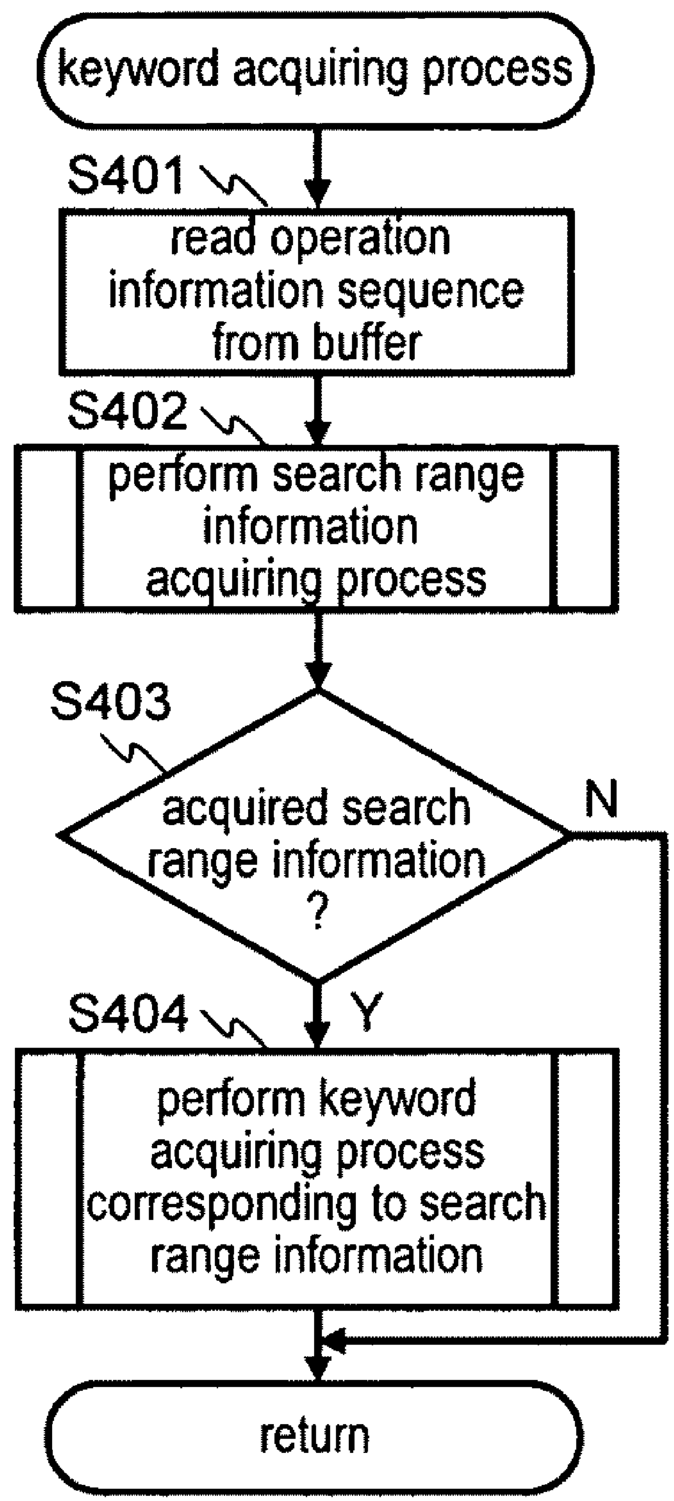
FIG. 4 is a flowchart illustrating an operation of a keyword acquiring process in the embodiment.
Figure 5:
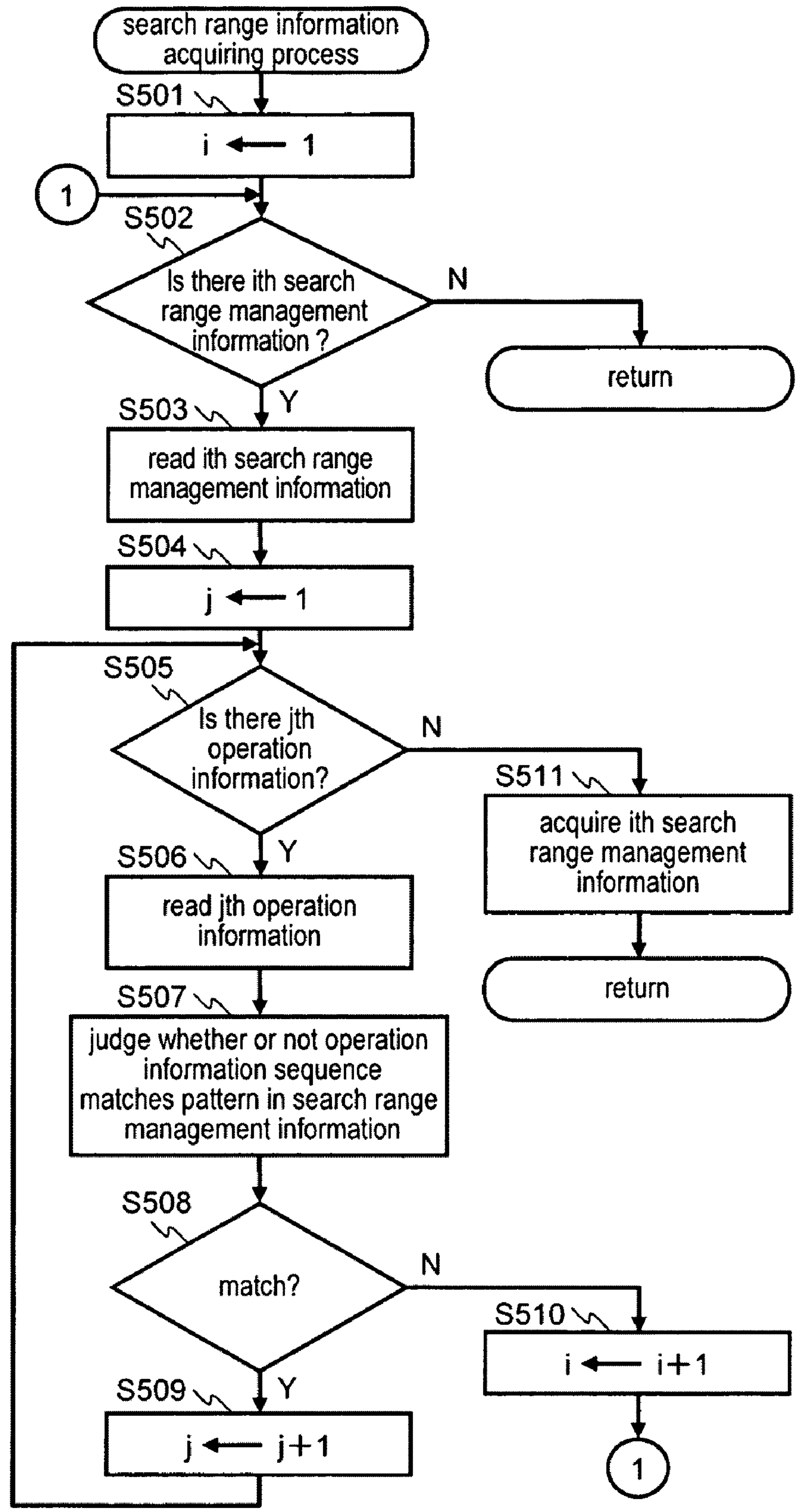
FIG. 5 is a flowchart illustrating an operation of a search range information acquiring process in the embodiment.
Figure 6:
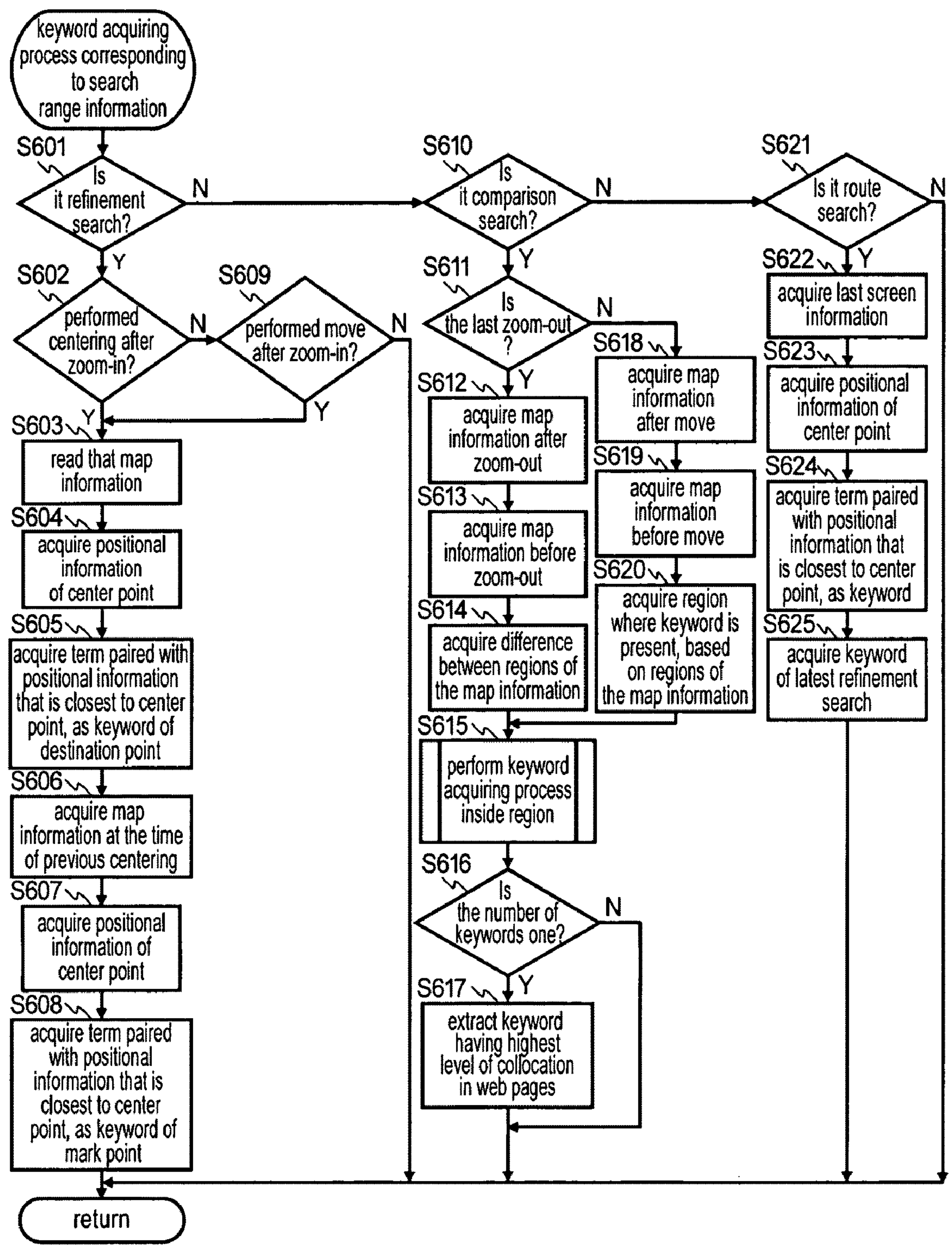
FIG. 6 is a flowchart illustrating a detailed operation of the keyword acquiring process in the embodiment.
Figure 7:
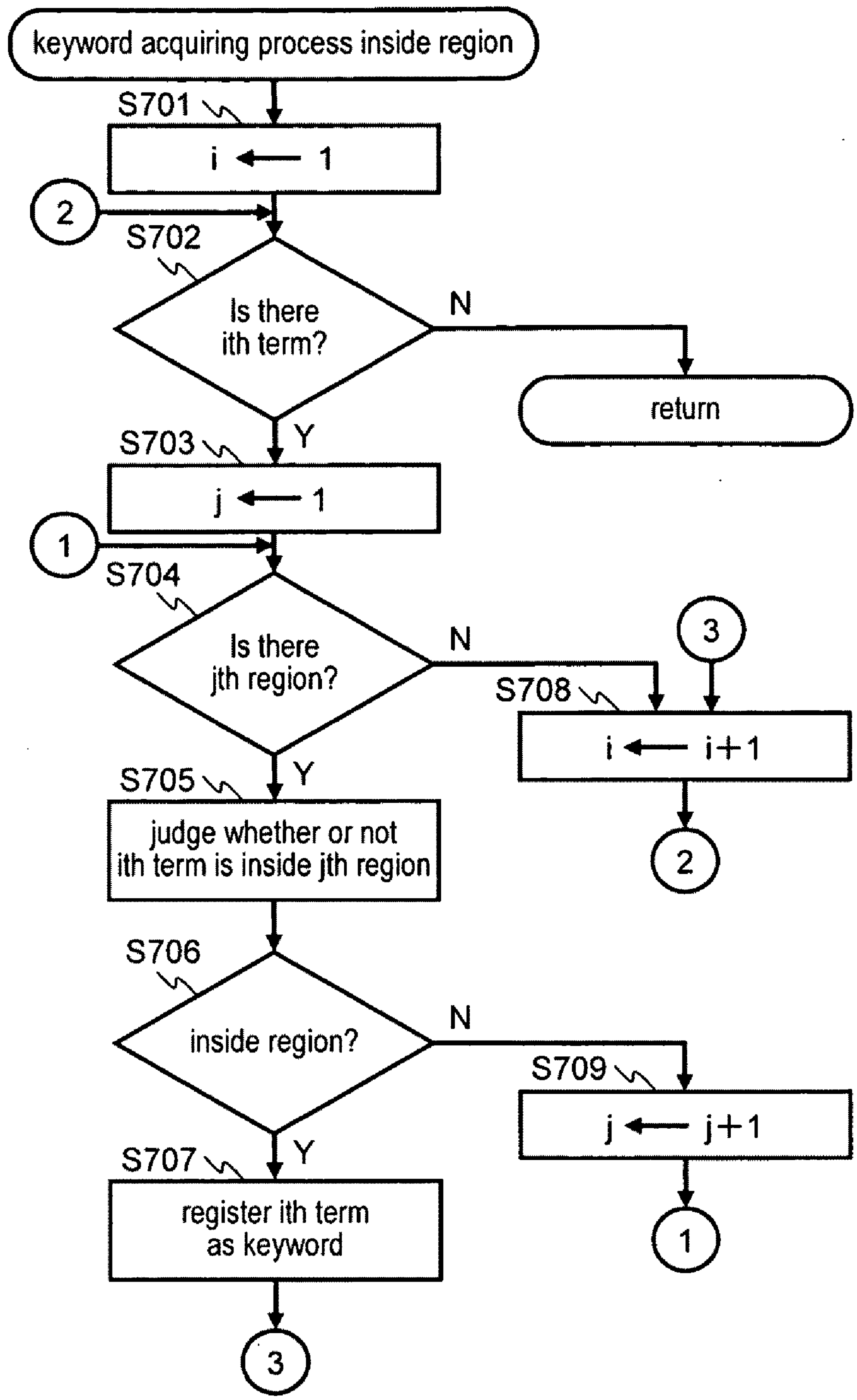
FIG. 7 is a flowchart illustrating a detailed operation of the keyword acquiring process in the embodiment.
Figure 8:
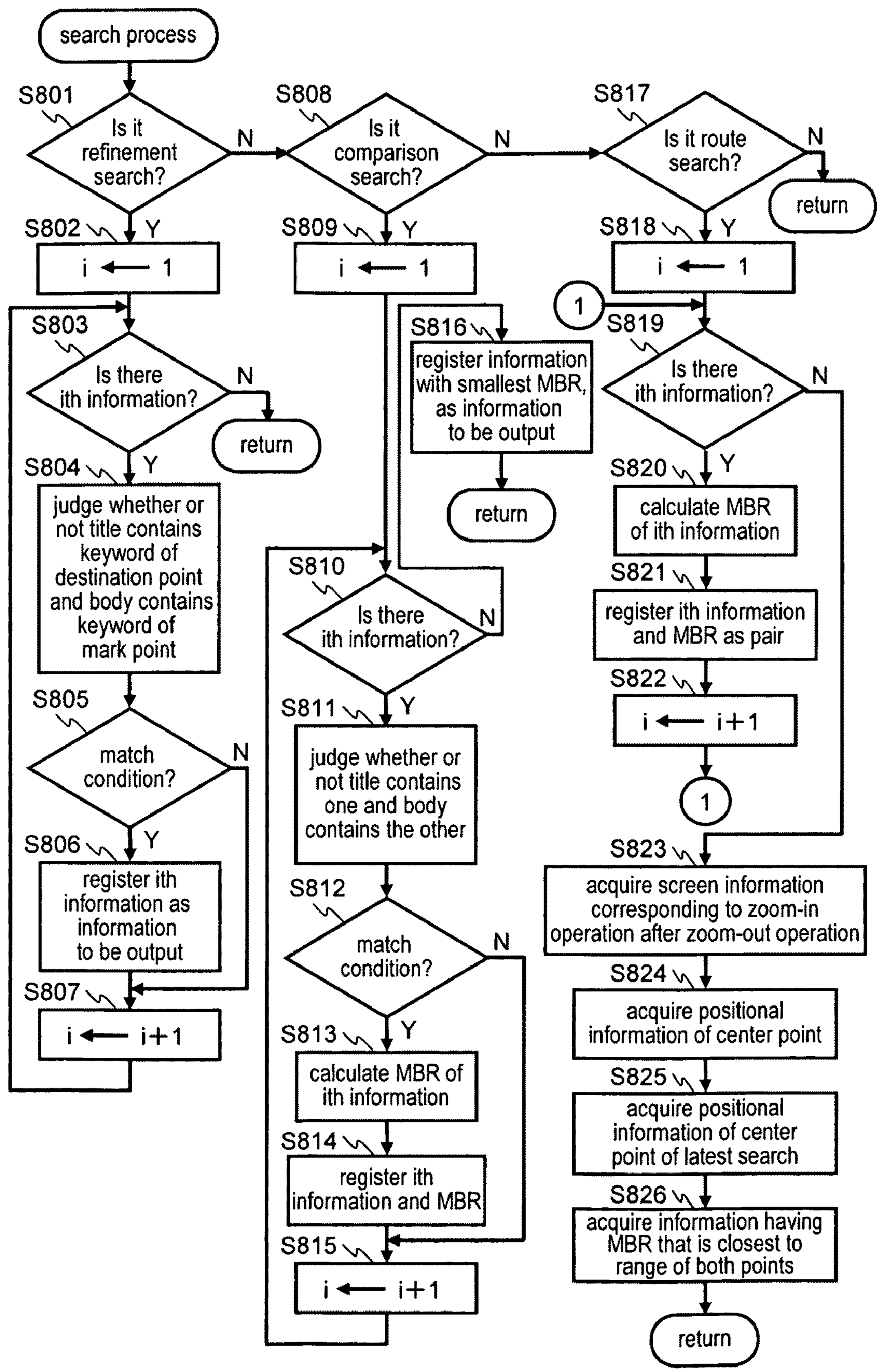
FIG. 8 is a flowchart illustrating a search process in the embodiment.
Figure 9:
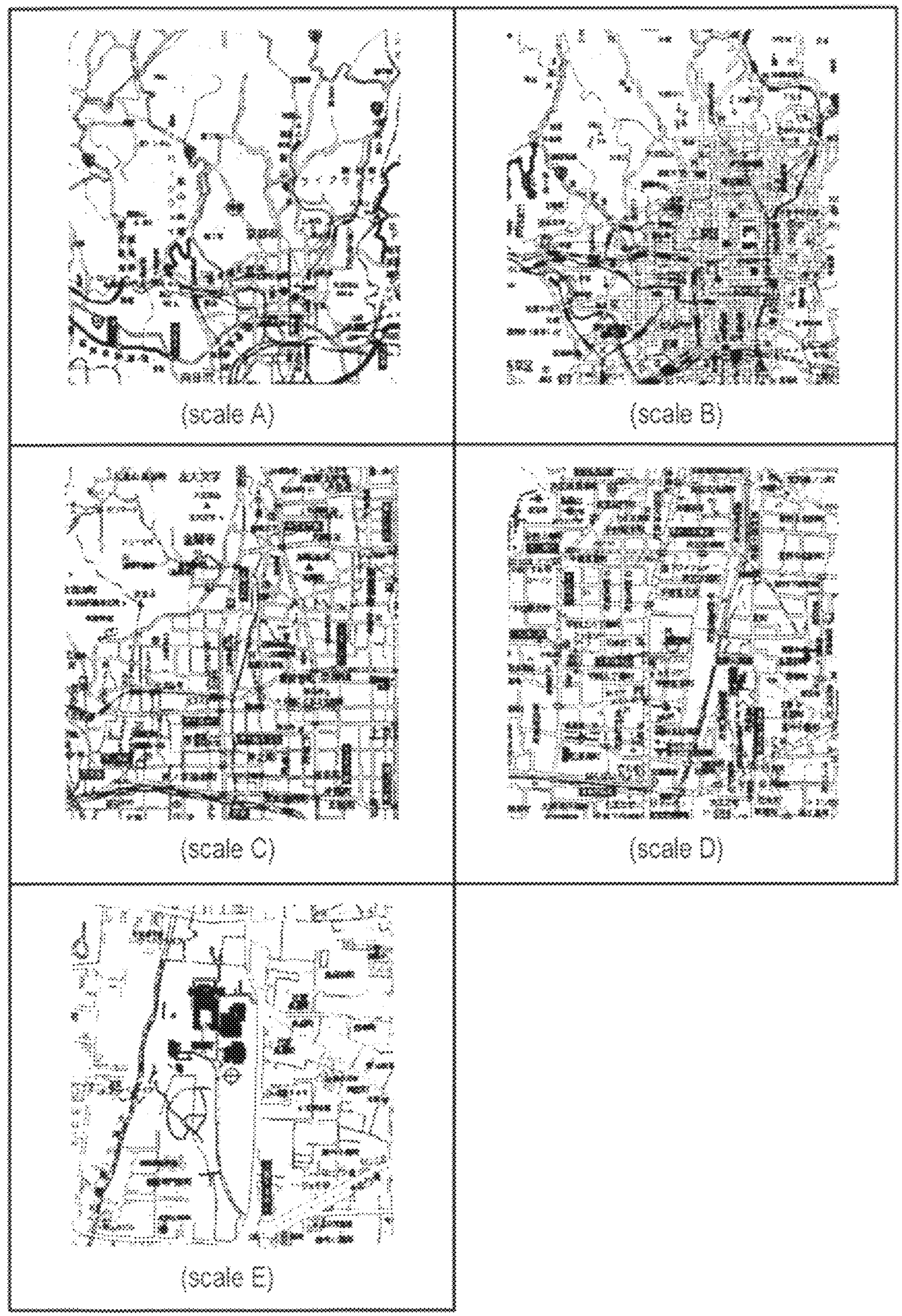
FIG. 9 is a view showing map image information in the embodiment.
Figure 13:
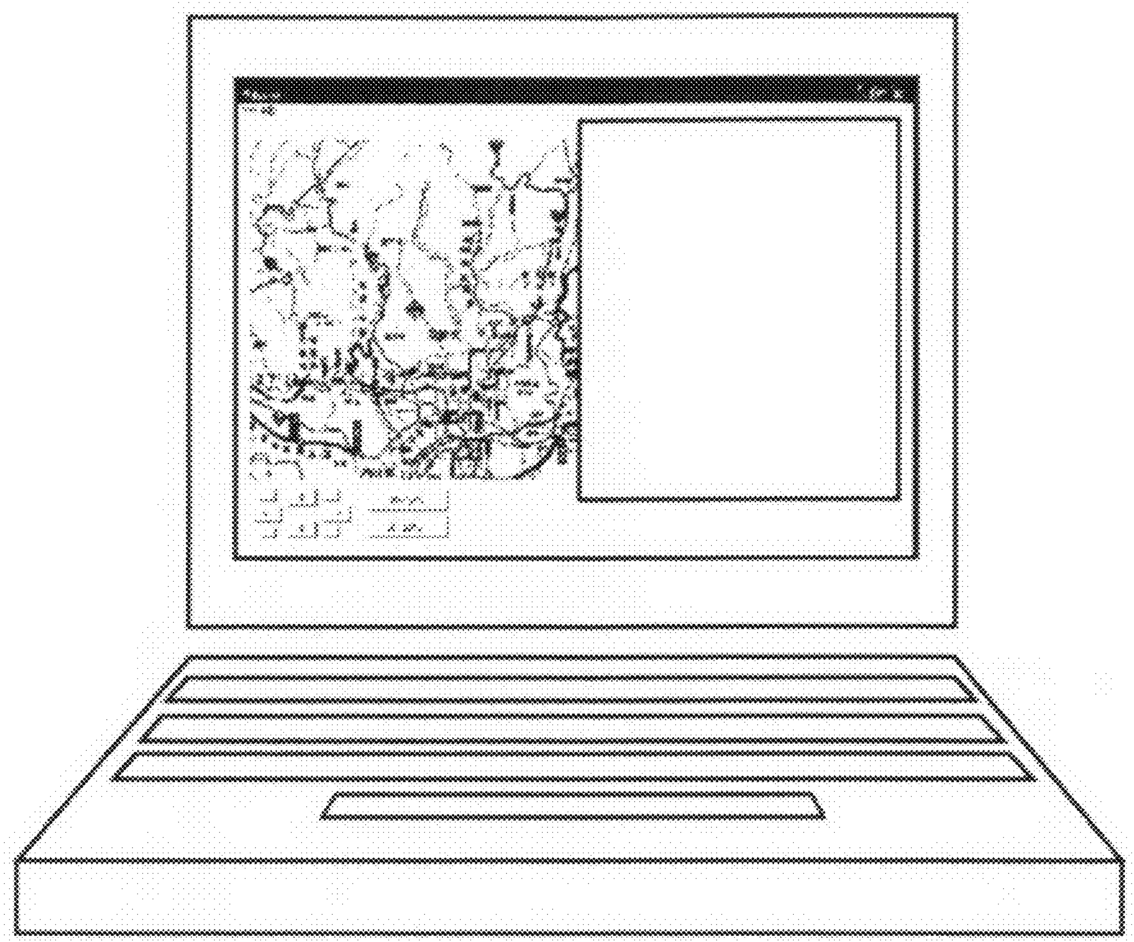
FIG. 13 is a view showing an output example of the map information processing apparatus in the embodiment.
Figure 14:
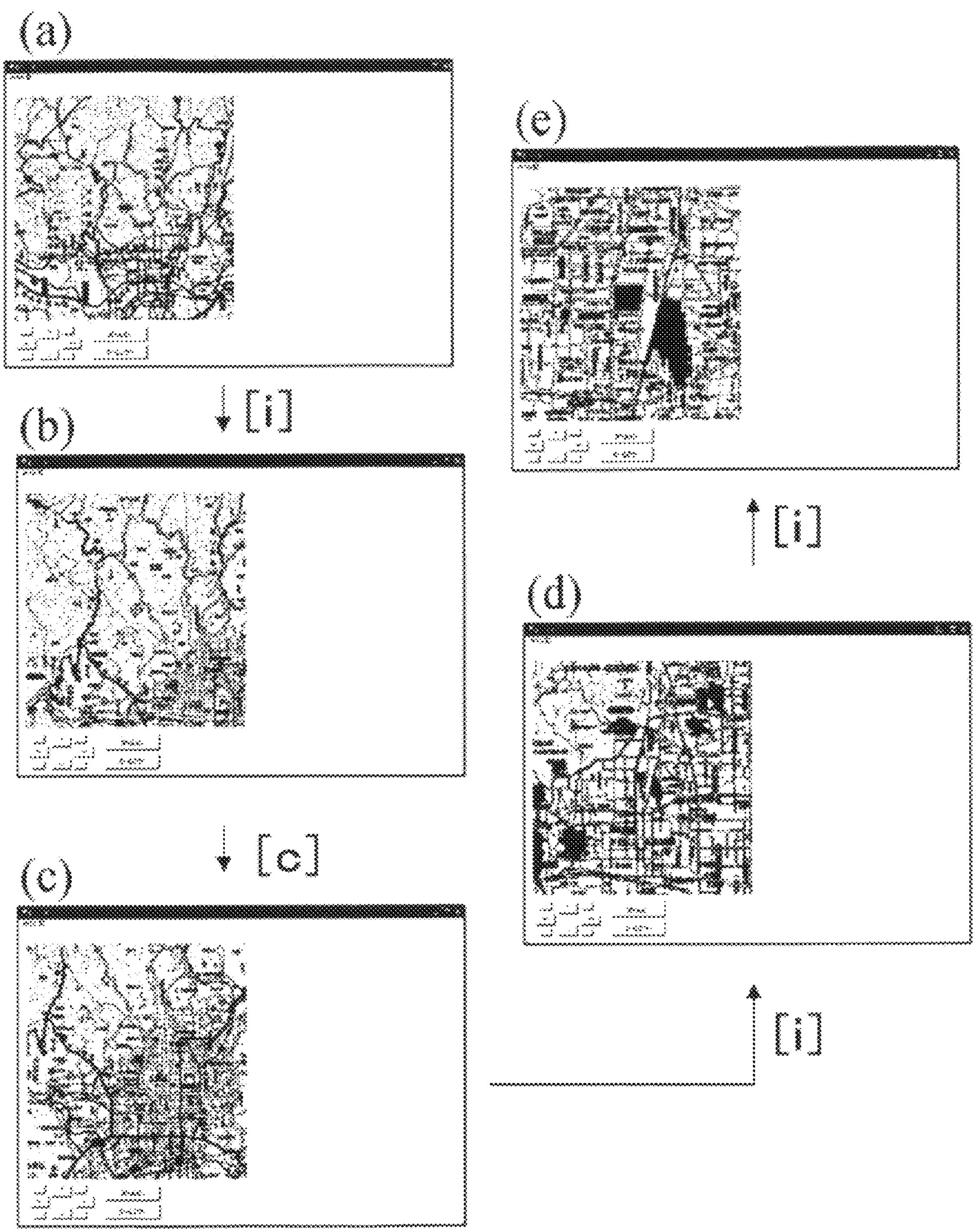
FIG. 14 is a view showing an example of the map output change in the embodiment.
Figure 19:
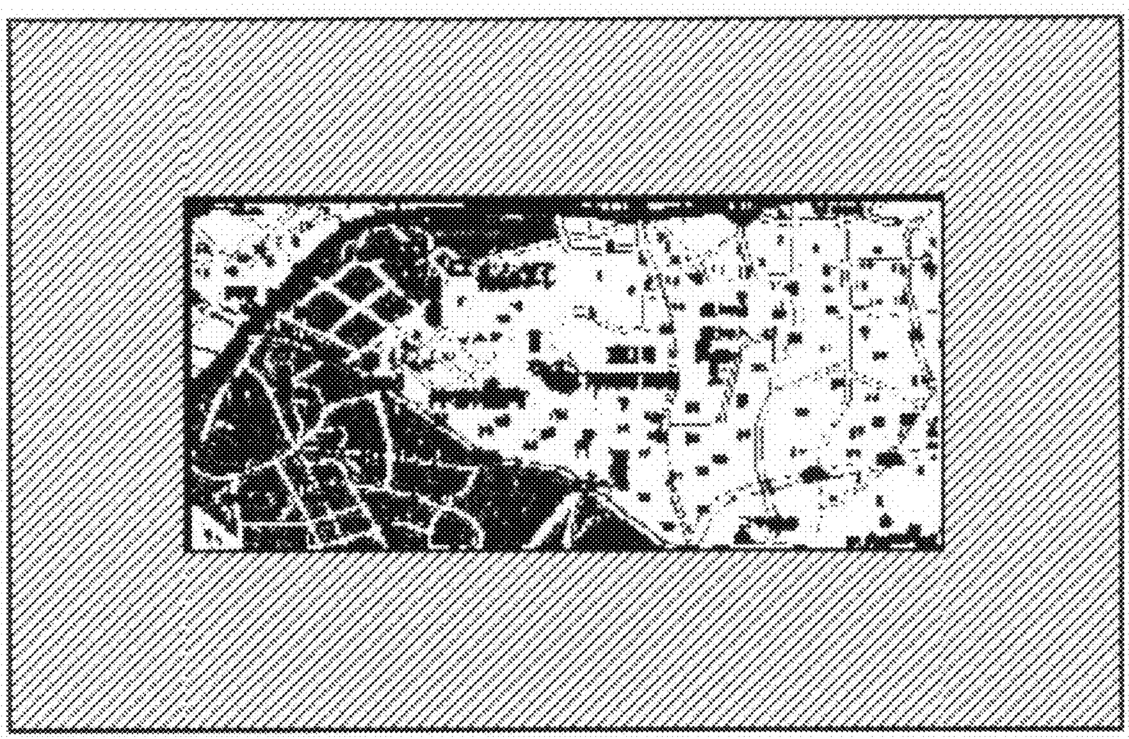
FIG. 19 is a view illustrating a region in which a keyword is acquired in the embodiment.
Figure 20:
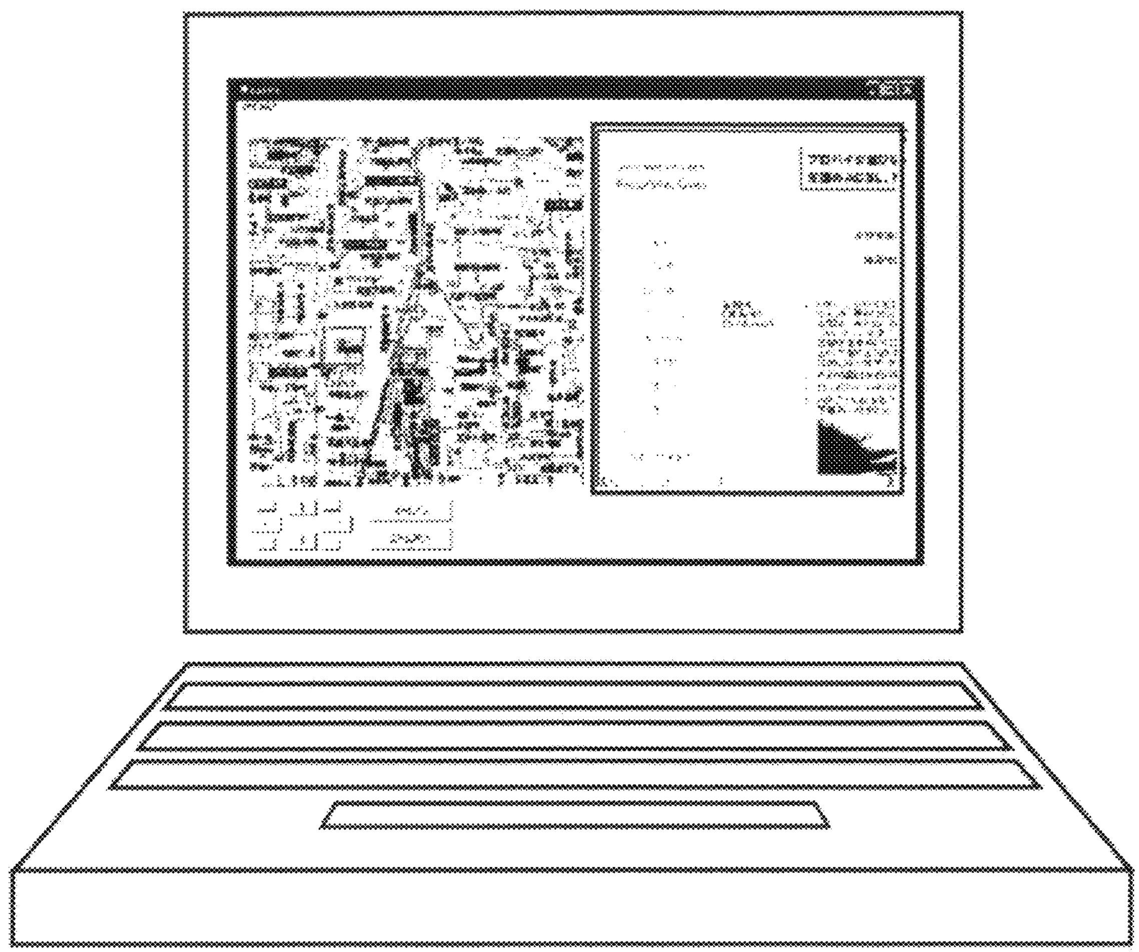
FIG. 20 is a view showing an output example of the map information processing apparatus in the embodiment.
Figure 21:
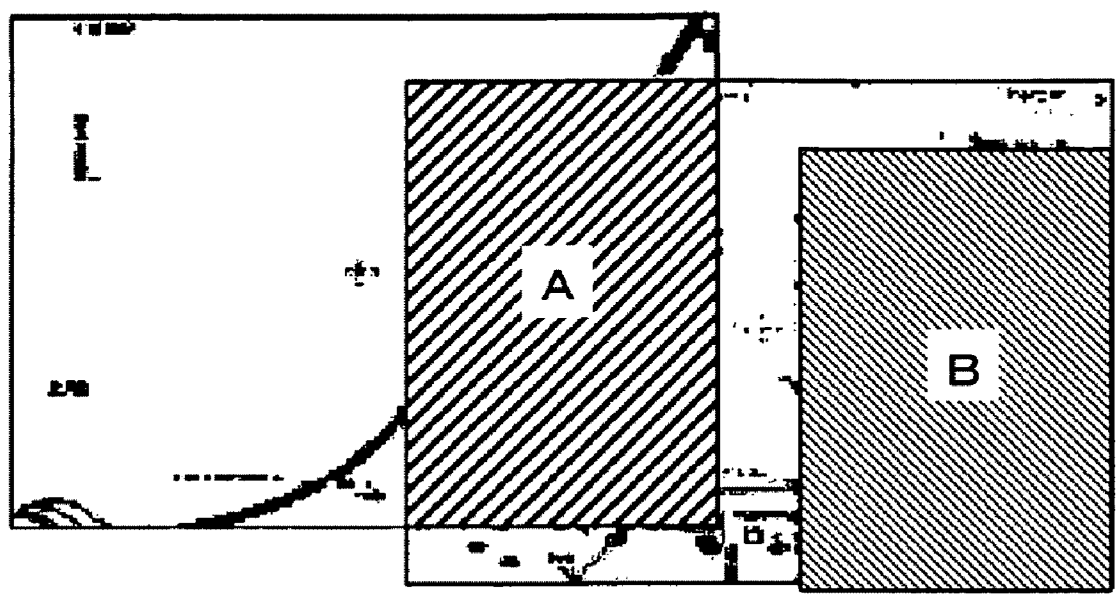
FIG. 21 is a view illustrating a region in which a keyword is acquired in the embodiment.
Figure 23:
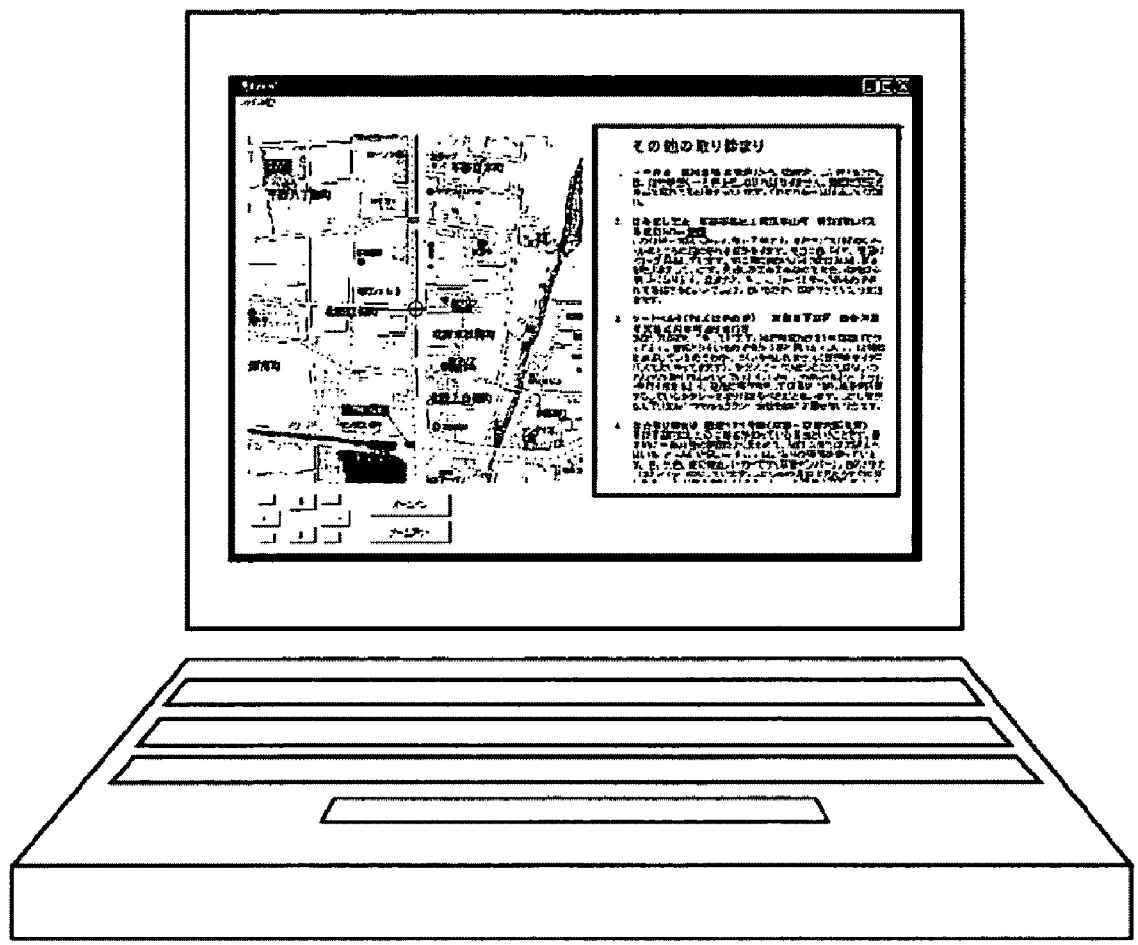
FIG. 23 is a view showing an output example of the map information processing apparatus in the embodiment.
Figure 24:
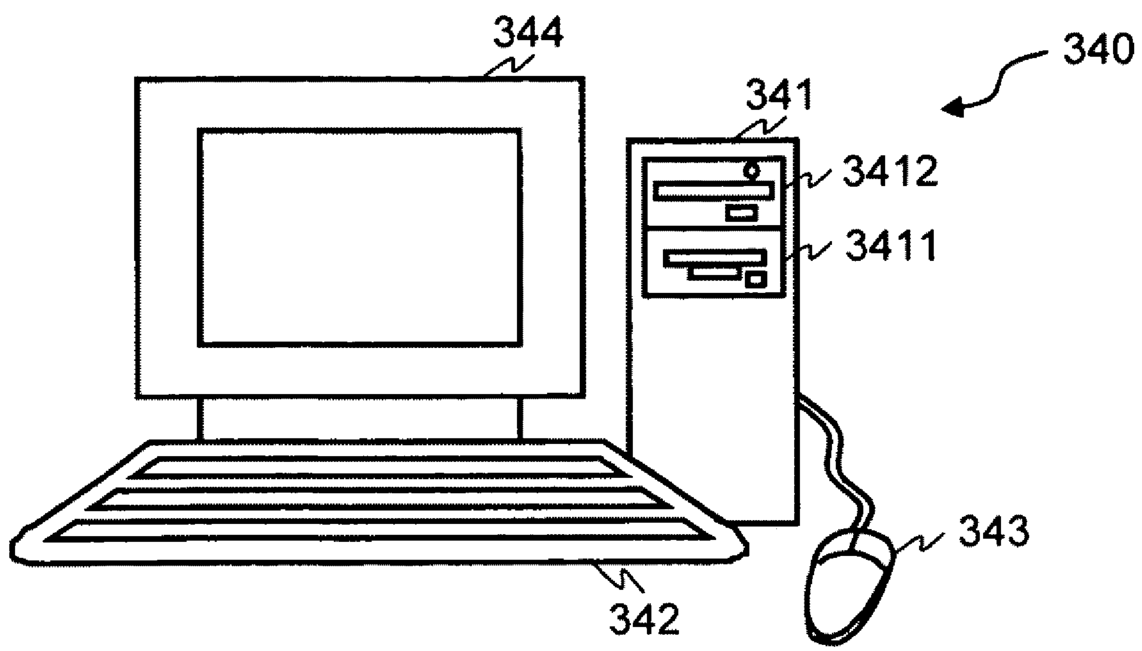
FIG. 24 is a schematic view of a computer system that realizes the map information processing apparatus in the embodiment.
Figure 25:
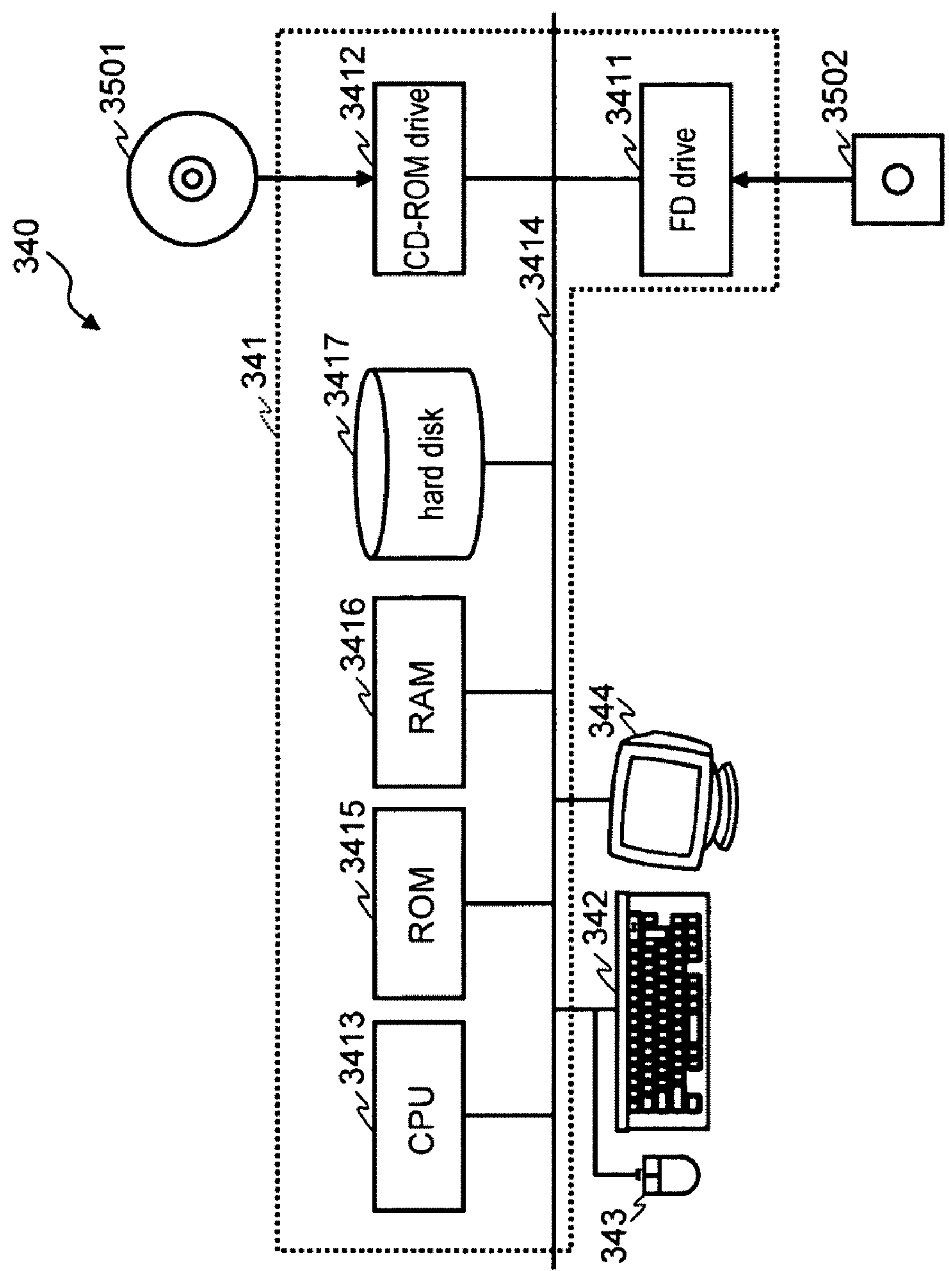
FIG. 25 is a block diagram of the computer system that realizes the map information processing apparatus in the embodiment.

11 map information processing apparatus
12 information storage apparatus
1101 map information storage portion
1102 accepting portion
1103 map output portion
1104 map output changing portion
1105 operation information sequence acquiring portion
1106 keyword acquiring portion
1107 retrieving portion
1108 information output portion
11061 search range management information storage unit
11062 search range information acquiring unit
11063 keyword acquiring unit

The invention claimed is:

1. A map information processing apparatus, comprising:

a map information storage portion in which map information, which is information of a map, is stored in a storage medium;

an accepting portion that accepts a map browse operation sequence, which is multiple operations to browse the map;

an operation information sequence acquiring portion that acquires an operation information sequence, which is information of multiple operations corresponding to the map browse operation sequence;

a keyword acquiring portion that acquires at least one keyword from the map information using the operation information sequence;

a retrieving portion that retrieves information using the at least one keyword, wherein the retrieved information is one or more web pages on the internet; and an information output portion that outputs the information retrieved by the retrieving portion, wherein the accepting portion also accepts an instruction to output the map, and the map information processing apparatus further comprises:

a map output portion that reads the map information and outputs the map in a case where the accepting portion accepts an instruction to output the map; and a map output changing portion that changes output of the map according to a map browse operation in a case where the accepting portion accepts the map browse operation, wherein the keyword acquiring portion further comprises:

a search range management information storage unit in which at least two pieces of search range management information are stored, each of which is a pair of an operation information sequence and search range information, which is information of a map range of a keyword that is to be acquired;

a search range information acquiring unit that acquires search range information corresponding to the operation information sequence that is at least one piece of operation information acquired by the operation information sequence acquiring portion, from the search range management information storage unit; and a keyword acquiring unit that acquires at least one keyword from the map information, according to the search range information acquired by the search range information acquiring unit, wherein the map browse operation includes a zoom-in operation (symbol [i]), a zoom-out operation (symbol [o]), a move operation (symbol [m]), and a centering operation (symbol [c]), and the operation information sequence is any one of a single-point specifying operation information sequence, which is information indicating an operation sequence of m*c+i+([*] refers to repeating an operation at least zero times, and [+] refers to repeating an operation at least once), and is an operation information sequence specifying one arbitrary point;

a multiple-point specifying operation information sequence, which is information indicating an operation sequence of m+o+, and is an operation information sequence specifying at least two arbitrary points;

a selection specifying operation information sequence, which is information indicating an operation sequence of i+c[c*m*]*, and is an operation information sequence sequentially selecting multiple points;

a surrounding-area specifying operation information sequence, which is information indicating an operation sequence of c+m*o+, and is an operation information sequence checking positional relationship between multiple points; a wide-area specifying operation information sequence, which is information indicating an operation sequence of o+m+, and is an operation information sequence causing movement along multiple points; and a combination of the five types of operation information sequences.

2. The map information processing apparatus according to claim 1, wherein the combination of the five types of operation information sequences is any one of:

a refinement search operation information sequence, which is an operation information sequence in which a single-point specifying operation information sequence is followed by a single-point specifying operation information sequence, and then the latter single-point specifying operation information sequence is followed by and partially overlapped with a selection specifying operation information sequence;

a comparison search operation information sequence, which is an operation information sequence in which a selection specifying operation information sequence is followed by a multiple-point specifying operation information sequence, and then the multiple-point specifying operation information sequence is followed by and partially overlapped with a wide-area specifying operation information sequence; and a route search operation information sequence, which is an operation information sequence in which a surrounding-area specifying operation information sequence is followed by a selection specifying operation information sequence.

3. The map information processing apparatus according to claim 2, wherein in the search range management information storage unit, at least search range management information is stored that has a refinement search operation information sequence and refinement search target information as a pair, the refinement search target information being information to the effect that a keyword of a destination point is acquired that is a point near the center point of the map output in a centering operation accepted after a zoom-in operation or in a move operation accepted after a zoom-in operation, and in a case where it is judged that the operation information sequence that is at least two pieces of operation information acquired by the operation information sequence acquiring portion corresponds to the refinement search operation information sequence, the search range information acquiring unit acquires the refinement search target information, and the keyword acquiring unit acquires at least a keyword of a destination point corresponding to the refinement search target information acquired by the search range information acquiring unit.

4. The map information processing apparatus according to claim 3, wherein the refinement search target information also includes information to the effect that a keyword of a mark point is acquired that is a point near the center point of the map output in a centering operation accepted before the zoom-in operation, and the keyword acquiring unit also acquires a keyword of a mark point corresponding to the refinement search target information acquired by the search range information acquiring unit.

5. The map information processing apparatus according to claim 2, wherein in the search range management information storage unit, at least search range management information is stored that has a comparison search operation information sequence and comparison search target information as a pair, the comparison search target information being information indicating a region representing a difference between the region of the map output after a zoom-out operation and the region of the map output before the zoom-out operation, and in a case where it is judged that the operation information sequence that is at least two pieces of operation information acquired by the operation information sequence acquiring portion corresponds to the comparison search operation information sequence, the search range information acquiring unit acquires the comparison search target information, and the keyword acquiring unit acquires at least a keyword corresponding to the comparison search target information acquired by the search range information acquiring unit.

6. The map information processing apparatus according to claim 2, wherein in the search range management information storage unit, at least search range management information is stored that has a comparison search operation information sequence and comparison search target information as a pair, the comparison search target information being information indicating a region obtained by excluding the region of the map output before a move operation from the region of the map output after the move operation, and in a case where it is judged that the operation information sequence that is at least two pieces of operation information acquired by the operation information sequence acquiring portion corresponds to the comparison search operation information sequence, the search range information acquiring unit acquires the comparison search target information, and the keyword acquiring unit acquires at least a keyword corresponding to the comparison search target information acquired by the search range information acquiring unit.

7. The map information processing apparatus according to claim 5, wherein the information retrieved by the retrieving portion is multiple web pages on the Internet, and in a case where a keyword corresponding to the comparison search target information acquired by the search range information acquiring unit is acquired, and the number of keywords acquired is only one, the keyword acquiring unit searches the multiple web pages for a keyword having the highest level of collocation with the one keyword, and acquires the keyword.

8. The map information processing apparatus according to claim 2, wherein in the search range management information storage unit, at least search range management information is stored that has a route search operation information sequence and route search target information as a pair, the route search target information being information to the effect that a keyword of a destination point is acquired that is a point near the center point of the map output in an accepted zoom-in operation or zoom-out operation, and in a case where it is judged that the operation information sequence that is at least one piece of operation information acquired by the operation information sequence acquiring portion corresponds to the route search operation information sequence, the search range information acquiring unit acquires the route search target information, and the keyword acquiring unit acquires at least a keyword of a destination point corresponding to the route search target information acquired by the search range information acquiring unit.

9. The map information processing apparatus according to claim 8, wherein the route search target information also includes information to the effect that a keyword of a mark point is acquired that is a point near the center point of the map output in a centering operation accepted before the zoom-in operation, and the keyword acquiring unit also acquires a keyword of a mark point corresponding to the route search target information acquired by the search range information acquiring unit.

10. The map information processing apparatus according to claim 9, wherein the information to be retrieved by the retrieving portion is at least one web page on the Internet, and in a case where the accepting portion accepts a refinement search operation information sequence, the retrieving portion retrieves a web page that has the keyword of the destination point in a title thereof and the keyword of the mark point in a page thereof.

11. The map information processing apparatus according to claim 9, wherein the map information has map image information indicating an image of the map, and term information having a term on the map and positional information indicating the position of the term, the information to be retrieved by the retrieving portion is at least one web page on the Internet, and the retrieving portion acquires at least one web page that contains both the keyword of the mark point and the keyword of the destination point, detects at least two terms from each of the at least one web page that has been acquired, acquires at least two pieces of positional information indicating the positions of the at least two terms, from the map information, acquires geographical range information, which is information indicating a geographical range of a description of a web page, for each web page, using the at least two pieces of positional information, and acquires at least a web page in which the geographical range information indicates the smallest geographical range.

12. The map information processing apparatus according to claim 11, wherein in a case where at least one web page that contains both the keyword of the mark point and the keyword of the destination point is acquired, the retrieving portion acquires at least one web page that has at least one of the keywords in a title thereof.

* * * * *